(12) United States Patent
Merkt

(10) Patent No.: US 11,098,461 B2
(45) Date of Patent: Aug. 24, 2021

(54) SYSTEM FOR CONTOURING TURF USING HIERARCHICAL CONTROL

(71) Applicant: G2 Turftools, Inc., Athens, AL (US)

(72) Inventor: Eric L. Merkt, Athens, AL (US)

(73) Assignee: G2 Turftools, Inc., Athens, AL (US)

( * ) Notice: Subject to any disclaimer, the term of this patent is extended or adjusted under 35 U.S.C. 154(b) by 378 days.

(21) Appl. No.: 16/400,548

(22) Filed: May 1, 2019

(65) Prior Publication Data
US 2019/0257058 A1    Aug. 22, 2019

Related U.S. Application Data

(63) Continuation-in-part of application No. 15/467,258, filed on Mar. 23, 2017, now abandoned.

(51) Int. Cl.
*E02F 3/84* (2006.01)
*E02F 3/78* (2006.01)

(52) U.S. Cl.
CPC .............. *E02F 3/842* (2013.01); *E02F 3/783* (2013.01)

(58) Field of Classification Search
CPC ........ A01D 43/12; A01D 34/53; A01D 34/54; A01D 34/008; E02F 3/842; E02F 3/783; E02F 3/78; E02F 3/847
See application file for complete search history.

(56) References Cited

U.S. PATENT DOCUMENTS

| | | | |
|---|---|---|---|
| 2,957,254 A | 10/1960 | Bederman et al. | |
| 3,314,175 A * | 4/1967 | Petty | E02F 3/783 37/386 |
| 3,672,452 A | 6/1972 | Miner | |
| 3,986,782 A | 10/1976 | Durham | |
| 4,342,162 A * | 8/1982 | Spaans | E02D 15/10 198/513 |
| 4,494,611 A | 1/1985 | Alvarez | |
| 4,807,131 A * | 2/1989 | Clegg | E02F 3/842 172/4.5 |
| 5,764,511 A * | 6/1998 | Henderson | E02F 3/842 172/4.5 |
| 5,917,593 A * | 6/1999 | Hirano | G01C 15/004 356/247 |

(Continued)

FOREIGN PATENT DOCUMENTS

DE    102007050508    4/2009

*Primary Examiner* — Adam J Behrens
(74) *Attorney, Agent, or Firm* — Joseph T. Guy; Kirk A. Wilson; Patent Filing Specialist Inc.

(57) ABSTRACT

A turfplaner is described comprising a rotational elongated cutter capable of independently altering a cut height of the rotational cutter based on a deviation between cut height and a desired cut profile. A hierarchical controller is in functional communication with the lift mechanism and a laser or GPS guidance system. The laser or GPS receiver is capable of receiving the planer laser beam or GPS signal and the hierarchical controller is capable of determining and minimizing a deviation between the cut height and the desired cut profile based on the laser or GPS receiver location relative to the planer laser beam or GPS signal. At least one autograde device and an autodepth device are in functional communication with the hierarchical controller to activate either on grade, below grade, or above grade control mode.

20 Claims, 33 Drawing Sheets

(56) References Cited

U.S. PATENT DOCUMENTS

| | | | |
|---|---|---|---|
| 5,935,183 A * | 8/1999 | Sahm | G01S 19/43 |
| | | | 701/50 |
| 7,029,199 B2 | 4/2006 | Mayfield et al. | |
| 7,100,703 B2 | 9/2006 | Etter | |
| 8,109,360 B2 | 2/2012 | Stewart et al. | |
| 8,555,992 B1 * | 10/2013 | Merkt | A01B 45/00 |
| | | | 172/1 |
| 2006/0201007 A1 * | 9/2006 | Piekutowski | E02F 3/847 |
| | | | 33/286 |
| 2010/0314141 A1 * | 12/2010 | Merkt | A01D 34/54 |
| | | | 172/4.5 |
| 2014/0174771 A1 * | 6/2014 | Merkt | A01B 45/00 |
| | | | 172/4.5 |

* cited by examiner

SYSTEM FOR CONTOURING TURF USING HIERARCHICAL CONTROL

CROSS-REFERENCE TO RELATED APPLICATIONS

The present application is a continuation-in-part of pending U.S. patent application Ser. No. 15/467,258, filed Mar. 23, 2017, and herein incorporated by reference in its entirety.

FIELD OF THE INVENTION

The present invention is related to a system for contouring turf to a predetermined level of undulation thereby allowing for a desired cut profile from almost planar to complex undulated patterns.

BACKGROUND

The present invention is directed to a machine for contouring a turfed area to provide predetermined contours or undulations. More specifically, the present invention is related to a turfplaner which comprises hydraulically activated levelers, auto-grade controls, auto-depth controls and a laser level and/or global positioning system (GPS) guidance system with a hierarchical control system for improved control over depth of cut and relative height of the surface.

There are many environments wherein a level grass surface is of utmost importance. By way of example, without limit thereto, are airplane runways, portions of golf courses, sports fields and the like. Leveling a large area has never been an exact science. The most common technique is to utilize a box blade, also referred to as a landscaping box, which has a forward cutting blade and a rearward drag blade. The forward cutting blade gathers materials from high spots and drags the material along while riding on the rearward drag blade. The material from the high spots is deposited in the low spots thereby decreasing undulations. One disadvantage with a box blade is that the variation from gravitational planarity is mostly a function of the tractor used to pull the box blade. It is difficult to change the general contour with a box blade and doing so generally requires many passes.

Even more difficult than forming a relatively planar area is forming an area with predetermined undulations or deviations from planarity. Golf green designers, for example, may desire an intentional deviation from planarity for various purposes such as mimicking a famous golf hole or green. This is extremely difficult with current techniques and existing equipment and often requires a large amount of work by hand which is neither cost effective nor particularly accurate.

U.S. Pat. No. 8,555,992 to Merkt, discloses a turfplaner with autograde, autodepth, and a turfplaner controller with limited application because of poor or failed hydraulic control logic to properly position the cutting head in situations where the laser and/or GPS receiver signal is outside of upper and lower limits. The failure typically occurs while planing highly undulated surfaces.

There has been a long felt need for an apparatus, and method, for accurately contouring turf to a predetermined level of undulation. Provided herein is an apparatus and method which provides that which was previously lacking in the art.

SUMMARY OF THE INVENTION

The invention relates to an improved system and method for contouring turf. More specifically, the present invention is related to a turf planer comprising a hierarchical controller capable of altering the hierarchy of laser and/or GPS control on grade, below grade control and above grade control to achieve a desired cut profile.

These and other embodiments, as will be realized, are provided in a turfplaner capable of being transported over an area. The turfplaner comprises a rotational elongated cutter comprising a first side and a second side and a lift mechanism capable of independently altering a cut height of the first side of the rotational cutter and the second side of the rotational cutter based on a deviation between the cut height and a desired cut profile. Additionally, a hierarchical controller is in functional communication with the lift mechanism wherein the lift mechanism alters the cut height based on the deviation of the cut height relative to the desired cut profile in response to the functional communication. The hierarchical controller comprises a guidance system having at least one of a planer laser beam and a GPS guidance system extending over the area. At least one of a laser receiver and a GPS receiver are disposed on at least one of the first side or the second side wherein the laser or GPS receiver is positioned to intercept the planer laser beam or GPS signal and define a laser height or GPS height above the cut height. The laser receiver or GPS receiver is in functional communication with the hierarchical controller capable of determining and minimizing a deviation between the cut height and the desired cut profile based on the laser or GPS receiver location relative to the planer laser beam or GPS signal. At least one autograde device is disposed on at least one of the first side or the second side wherein the autograde device is in functional communication with the hierarchical controller. The autograde device measures the cut height relative to an adjacent profile and the hierarchical controller is capable of determining and minimizing a deviation of the cut height relative to the adjacent profile and controlling the lift mechanism to minimize the deviation of the cut height relative to the adjacent profile. An autodepth device is in functional communication with the hierarchical controller wherein the autodepth device comprises a mechanism for measuring a cut depth in the area. The hierarchical controller communicates a cutting head height adjustment using at least one control mode selected from the group consisting of on grade, above grade, and below grade.

Yet another embodiment is provided in a method of contouring an area of turf. The method comprises providing at least one planer laser beam or GPS guidance system extending over the area; providing a desired cut profile to a hierarchical controller; providing a turfplaner comprising a rotational elongated cutter further comprising a first side and a second side; and a lift mechanism capable of independently altering a cut height of the first side of the rotational cutter and the second side of the rotational based on a deviation between the cut height and a desired cut profile. The hierarchical controller is in functional communication with the lift mechanism wherein the lift mechanism alters the cut height based on the deviation of the cut height relative to the desired cut profile in response to the functional communication. The hierarchical controller comprises at least one of a laser receiver and a GPS receiver disposed on at least one of the first side or the second side wherein the laser or GPS receiver is positioned to intercept the planer laser beam or GPS signal and define a laser height or GPS height above the cut height. The laser receiver or GPS receiver is in functional communication with the hierarchical controller capable of determining and minimizing a deviation between the cut height and the desired cut profile based on the laser or GPS receiver location relative to the planer laser beam or GPS signal. At least one autograde device on at least one of the first side or the second side wherein the autograde device is in functional communication with the hierarchical controller and wherein the autograde device measures the cut height relative to an adjacent profile and the hierarchical controller is capable of determining and minimizing a deviation of the cut height relative to the adjacent profile and controlling the lift mechanism to minimize the deviation of the cut height relative to the adjacent profile. An autodepth device is in functional communication with the hierarchical controller wherein the autodepth device comprises a mechanism for measuring a cut depth in the area; and pulling the turfplaner over the area of turf wherein the hierarchical controller controls the lift mechanism by one of the deviation between the cut height and the desired cut profile using at least one control mode selected from the group consisting of on grade, above grade, and below grade.

DETAILED DESCRIPTION

The present invention is directed to an improved turfplaner and method of forming a desired cut profile in turf. More specifically, the turfplaner planes to a predetermined level relative to a combination of a laser beam or GPS signal, existing structure or a predetermined depth with hierarchical control. The hierarchical controller operationally functions in addition to the hydraulic control logic of a typical turfplaner control circuit using multiple control modes that are activated and deactivated when control limits are detected.

The invention will be described with reference to the figures which form an integral, non-limiting, component of the disclosure. Throughout the specification similar elements will be numbered accordingly.

As will be realized from the figures, and description herein, the turfplaner is intended for use behind a pull vehicle and most preferably behind a tractor. While not limited thereto, the turfplaner preferably derives power from a Power Take Off (PTO) on a tractor and from the tractor hydraulics. Other embodiments, such as a motor mounted on the turfplaner, are within the scope of the invention but a PTO drive is preferred due to cost and maintenance considerations.

The system comprises a laser which provides a planar laser beam or a GPS control system. The turfplaner comprises an elongated cutter which removes material. Laser or GPS receivers on either side, left or right side, of the turfplaner detect the height of the cutter relative to the fan beam or the correct distance below the fan beam. A rear transport mechanism rides on previously smoothed soil and provides a base. Hydraulic actuators raise, or lower, the cutter on each end relative to the base to maintain planarity between the laser or GPS receivers and the fan beam at the proper height.

A particularly preferred embodiment of the turfplaner is illustrated and will be described with reference to the figures. The turfplaner comprises a generally rectangular frame comprising a left side frame, 1, and a right hand side frame, 2, with frame supports, 3-5, and a front roller, 33, spanning there between. A frame tongue, 6, and associated brace, 7, allow the turfplaner to be towed by a tractor or related tow equipment. A jack, 114, and coupler hitch, 115, are preferably provided as would be realized.

Figure 11:
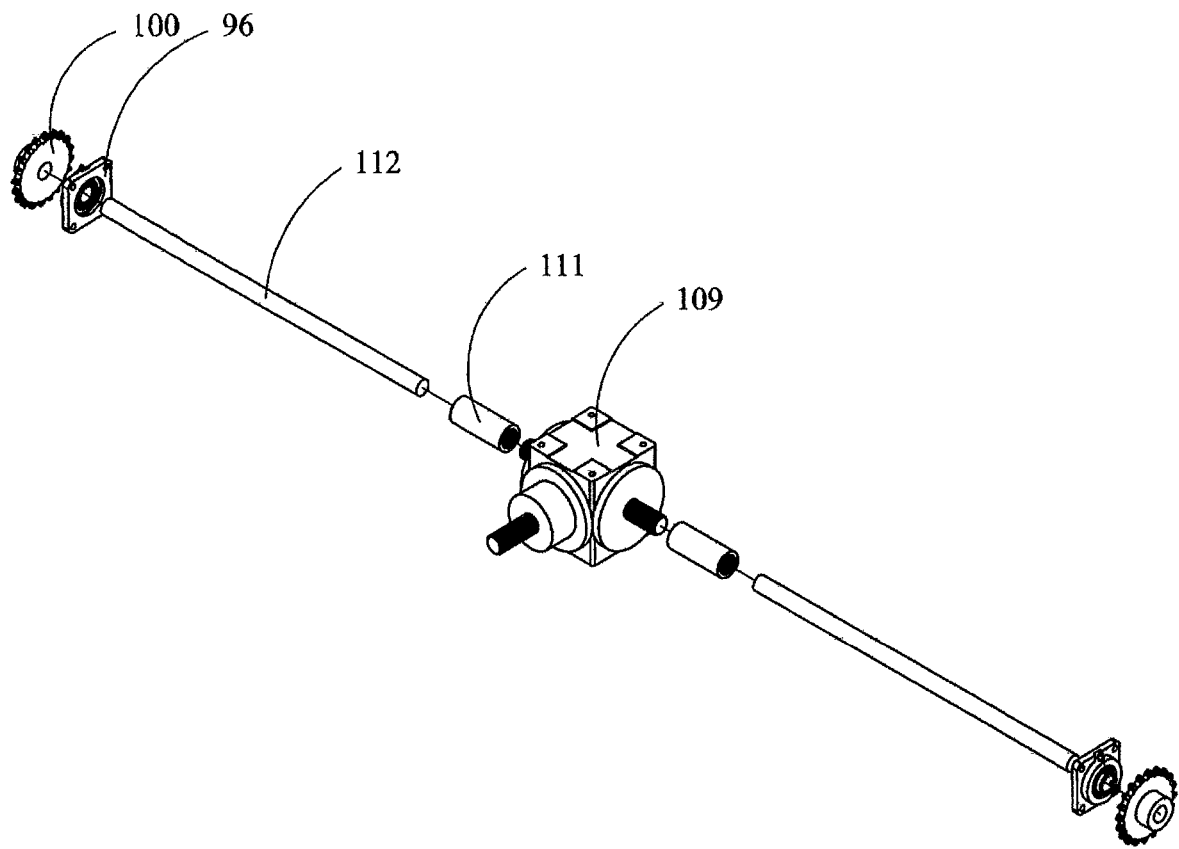
FIG. 11 is an exploded view of the gear drive assembly of a turfplaner.
Figure 12:
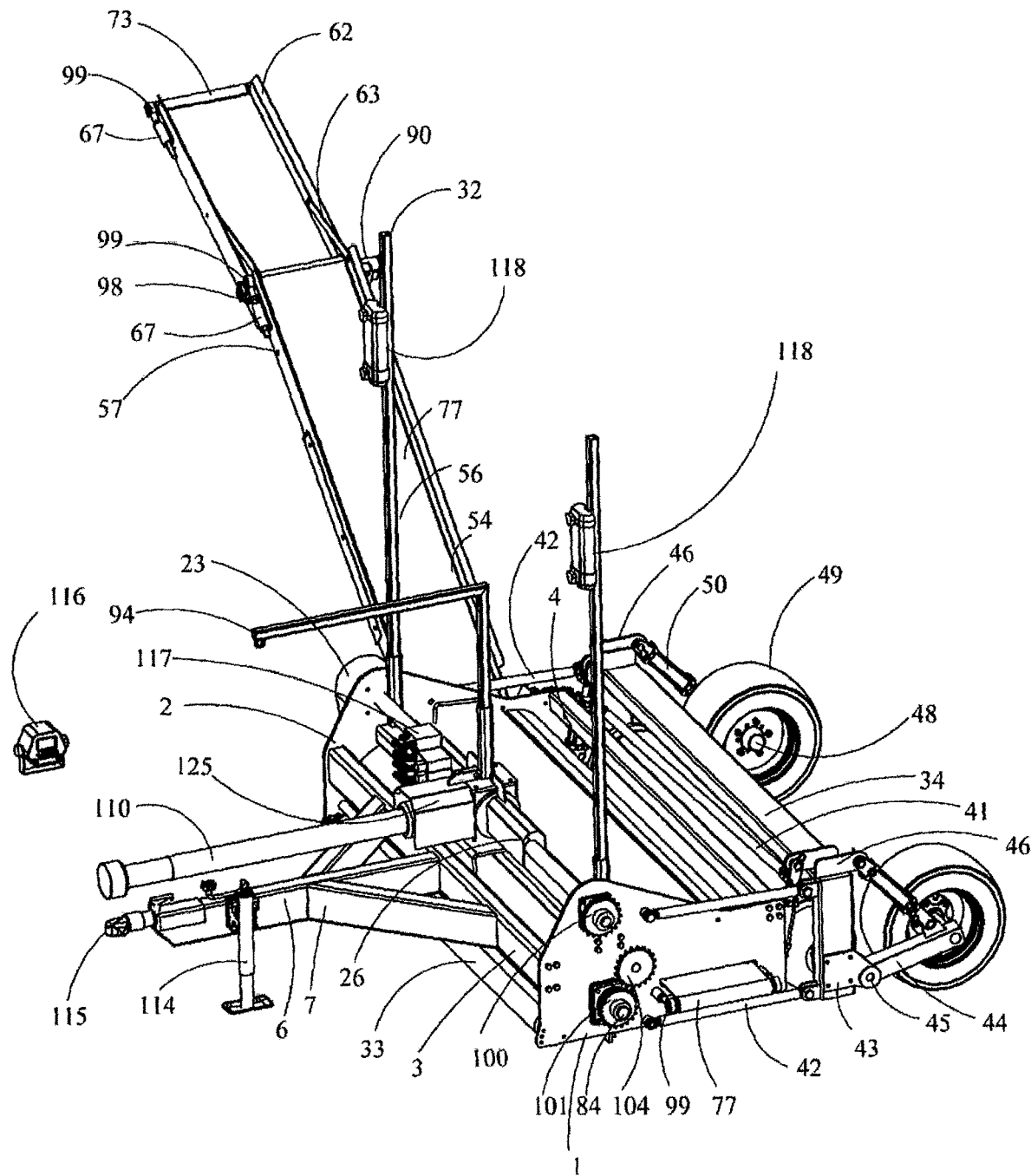
FIG. 12 is a perspective view of a turfplaner.
Figure 21:
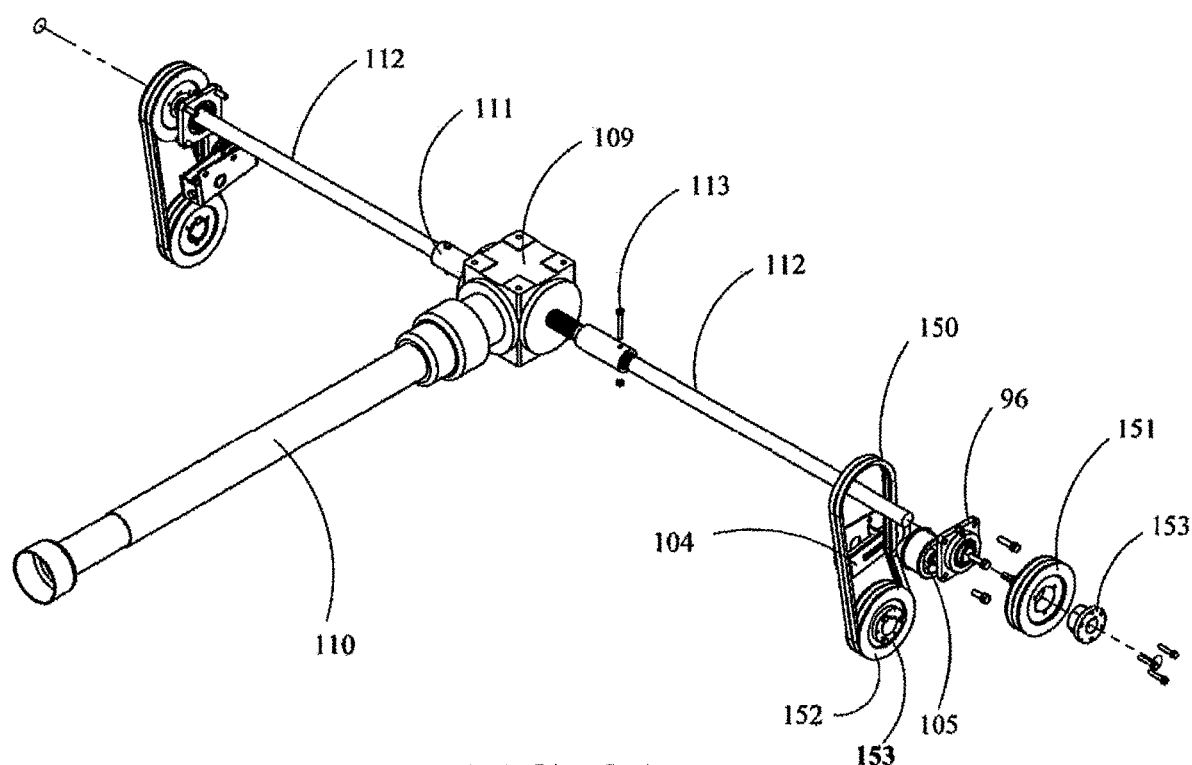
FIG. 21 is an exploded view of a gear drive assembly of a turfplaner.
Figure 22:
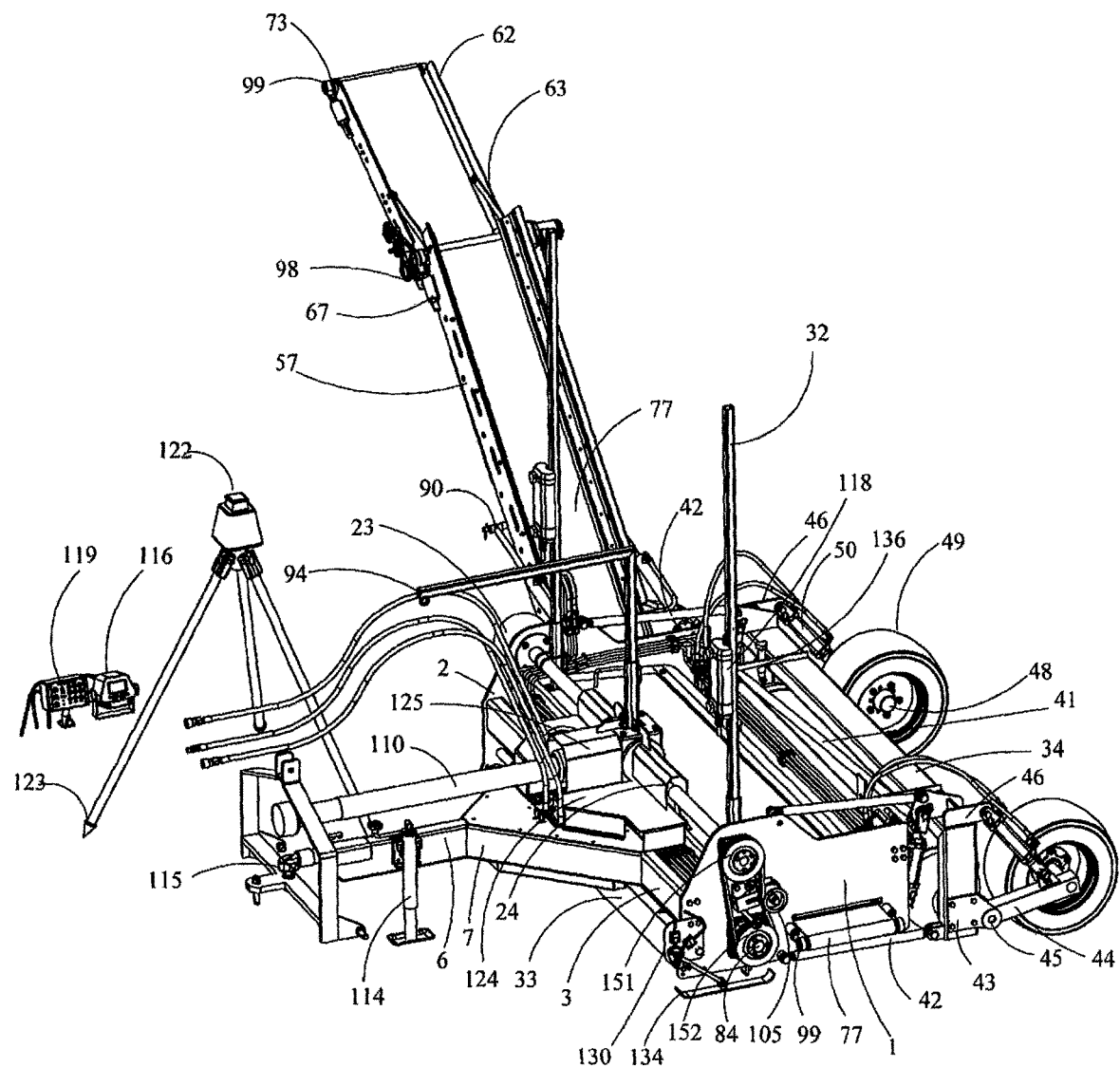
FIG. 22 is a perspective view of a turfplaner.

A drive assembly is illustrated in isolated view in FIGS. 11 and 21 and will be described with reference to FIGS. 11, 12, 14, 21 and 22. A gear box, 109, is mounted on the frame. The gear box can be mounted on a gear box mounting plate, 8, for convenience. The gear box preferably couples to the PTO of a tractor through a drive shaft, 110. The drive shaft is preferably coupled through universals on either side thereof as would be well known to those of skill in the art. A cover, 125, for the drive shaft and universal joints is preferred for safety and aesthetics. Half shafts, 112, are coupled to the gear box, 109, by half shaft couplers, 111, and associated fasteners, 113. Each half shaft is preferable supported by a half shaft bearing, 96. The half shaft is coupled to a half shaft drive sprocket, 100. A half shaft cover, 25, with half shaft coupler cover, 26, are provided for safety and aesthetics. A hydraulic hose support, 94, secures the hydraulic hose extending between the tractor and turfplaner from becoming entangled with other elements. Alternatively, a drive belt, 150, can be employed with associated pulleys, 151 and 152, tensioning rollers, 105, and bushings, 153.

The half shaft drive sprocket, 100, is coupled with a cutter head drive sprocket, 101. A drive idler sprocket, 104, is preferably provided to facilitate installation and tightening of a chain around the sprockets as would be realized in the art. The chain is not shown for clarity. Belts with associated pulleys and tensioning rollers can be used instead of a chain assembly. A preferred chain guard, 23, covers the chain and sprockets for safety and aesthetics. A single shaft could be employed but half shafts are preferred to minimize torque.

Figure 7A:
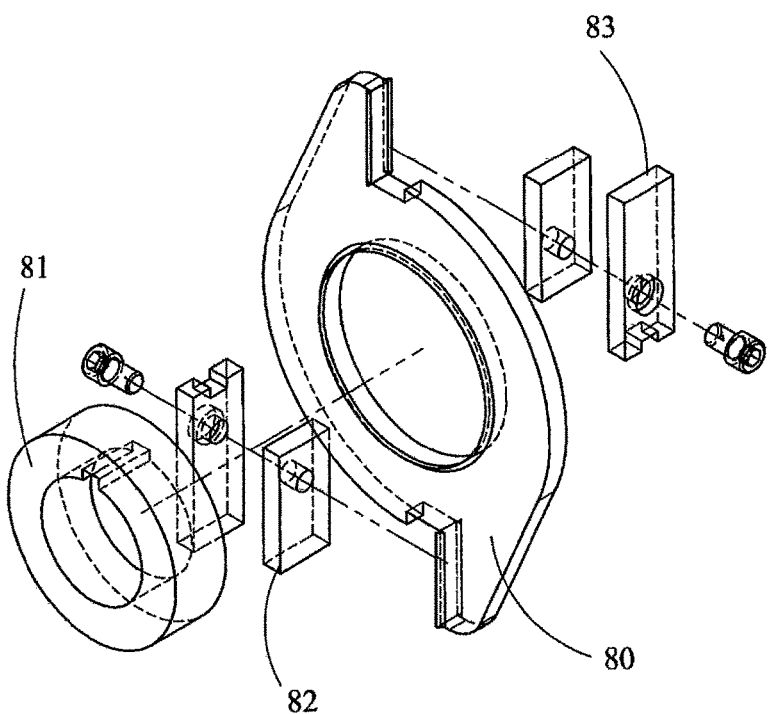
FIG. 7A is an exploded view of a cutter of the turfplaner.
Figure 7:
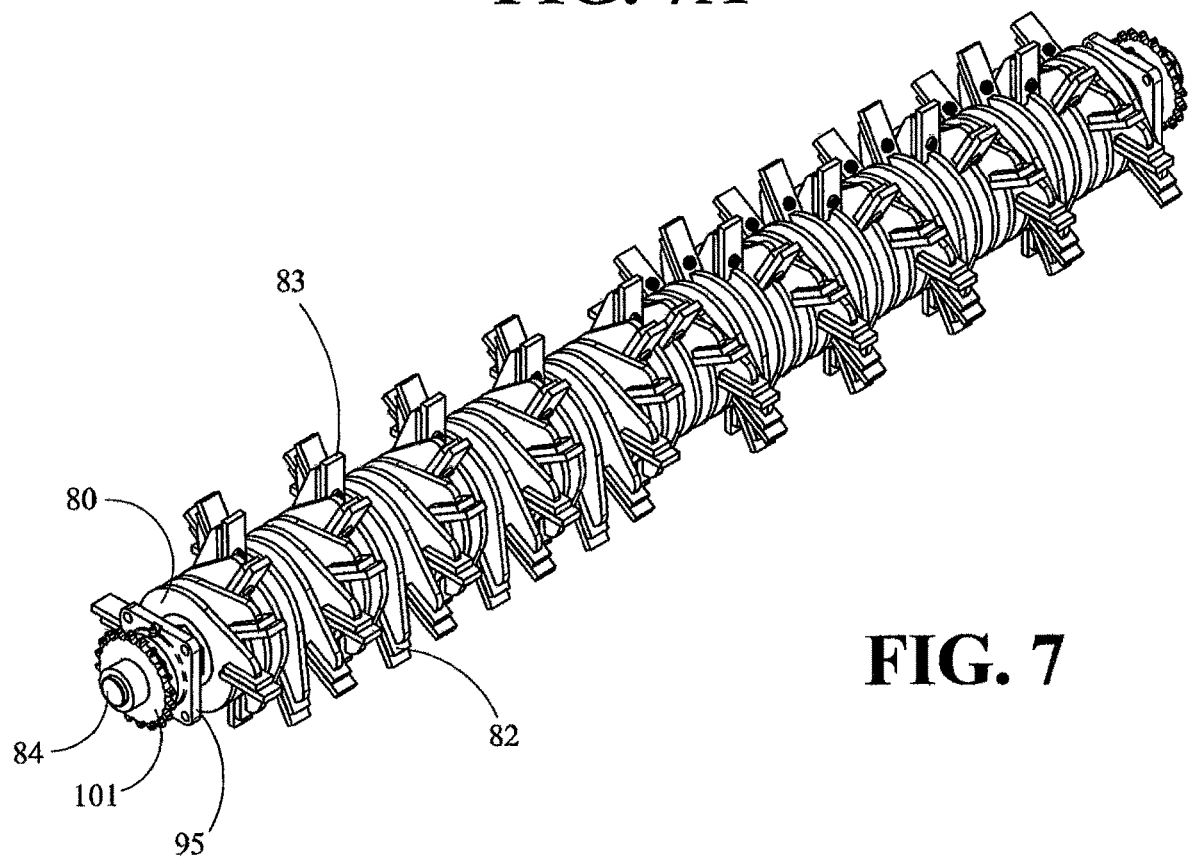
FIG. 7 is a perspective view of a cutter assembly in isolation.
Figure 8:
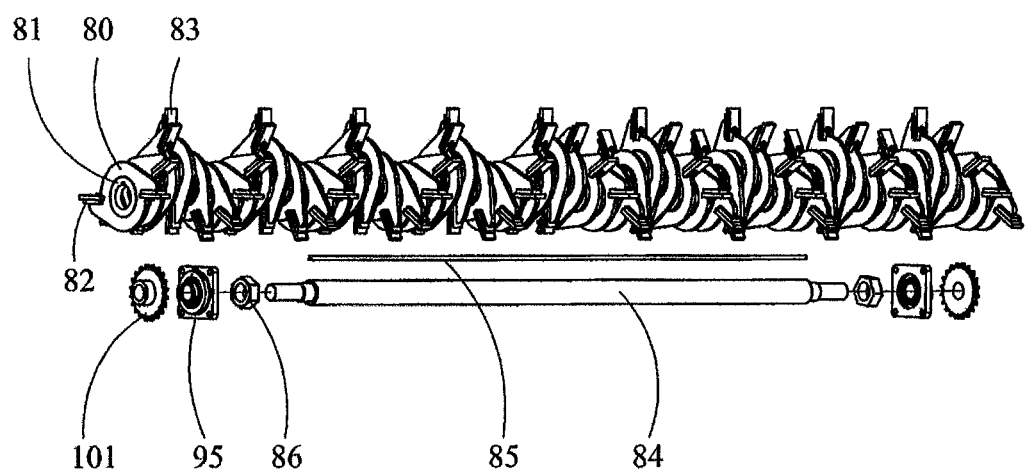
FIG. 8 is a partial expanded view of a cutter of the turfplaner.
Figure 9:
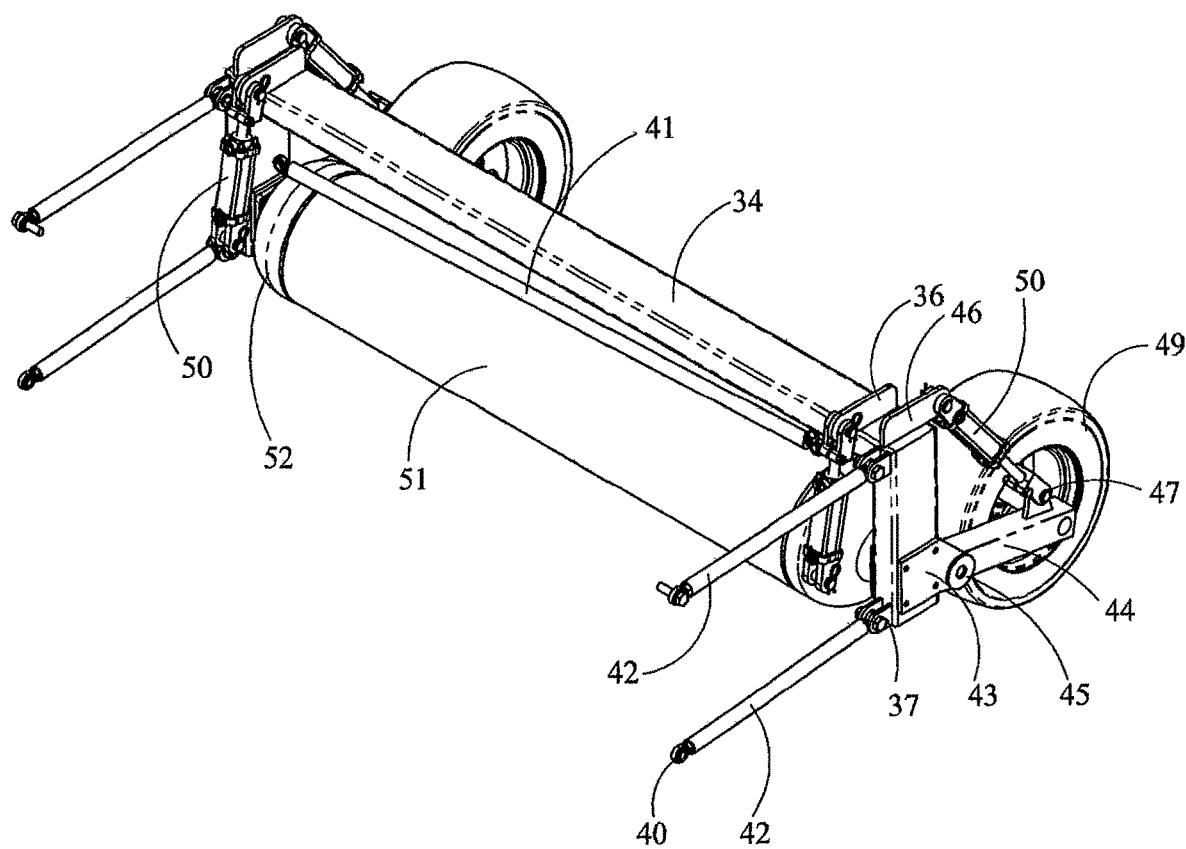
FIG. 9 is a perspective view of the rear roller assembly of a turfplaner.
Figure 10:
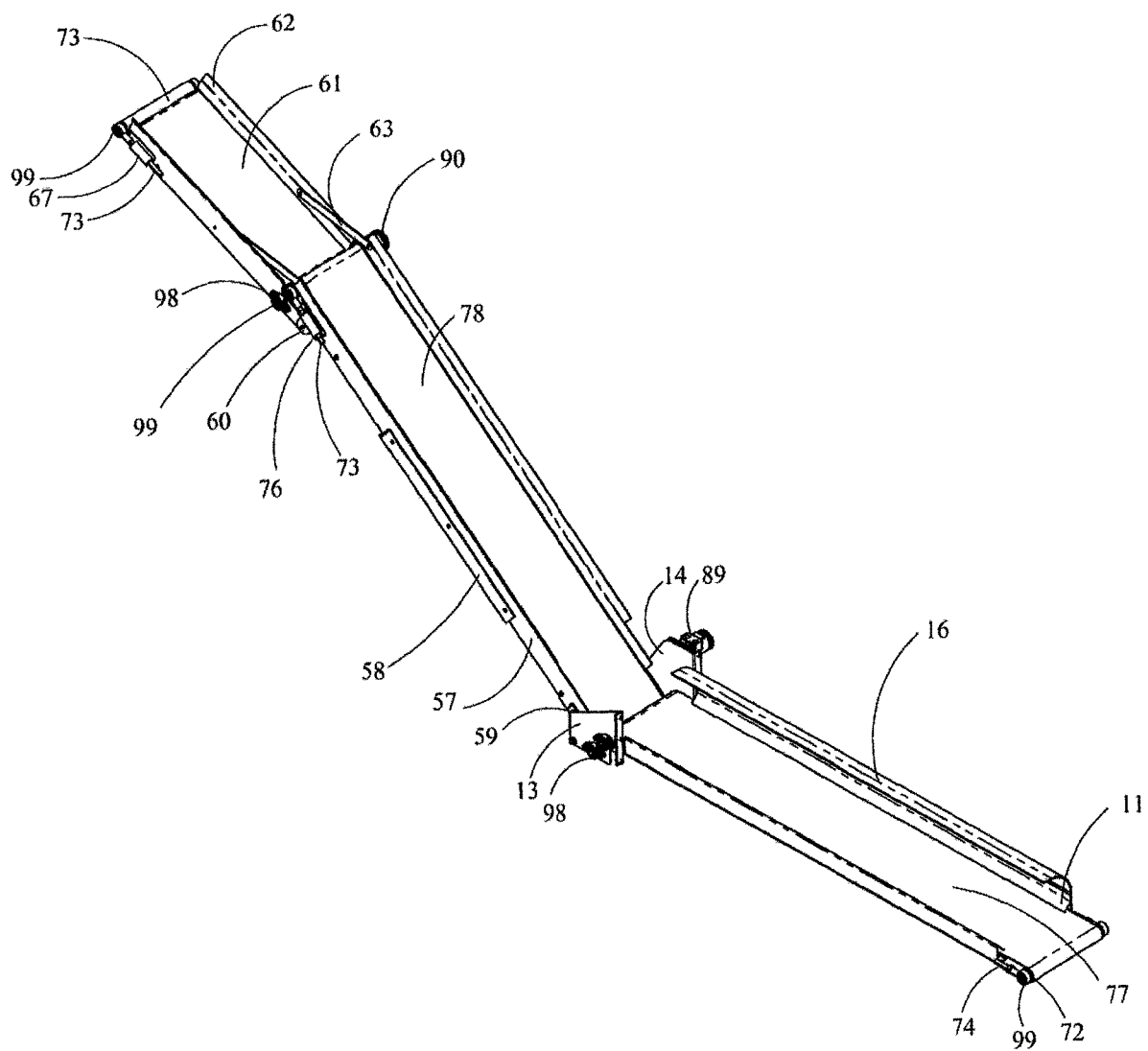
FIG. 10 is a perspective view of the conveyor of a turfplaner.

The cutter assembly will be described with particular reference to FIGS. 7, 7A and 8. The cutter assembly is attached to the frame. The cutting is accomplished by cutter teeth, 83. The cutter teeth are mounted on a cutter bracket, 80, with a cutter tooth mount, 82, preferably there between. The cutter bracket comprises an inner void for receiving a cutter bushing, 81. The cutter bushing is keyed the purpose of which will be more clear from further discussion. The inner voids of a series of cutter bushings are aligned and a cutter head shaft, 84, is received in the aligned inner voids. A cutter head keyway, 85, is received by the aligned key holes of the bushings. A cutter head nut, 86, on either end of the cutter head shaft secures the aligned and assembled cutters. The outer extent of the shaft is received by a cutter head bearing, 95, which is mounted to the side frames 1 and 2. As would be realized, the cutter rotation is preferably directly coupled to the PTO of the tractor through the gearing elements illustrated and described herein.

Figure 6:
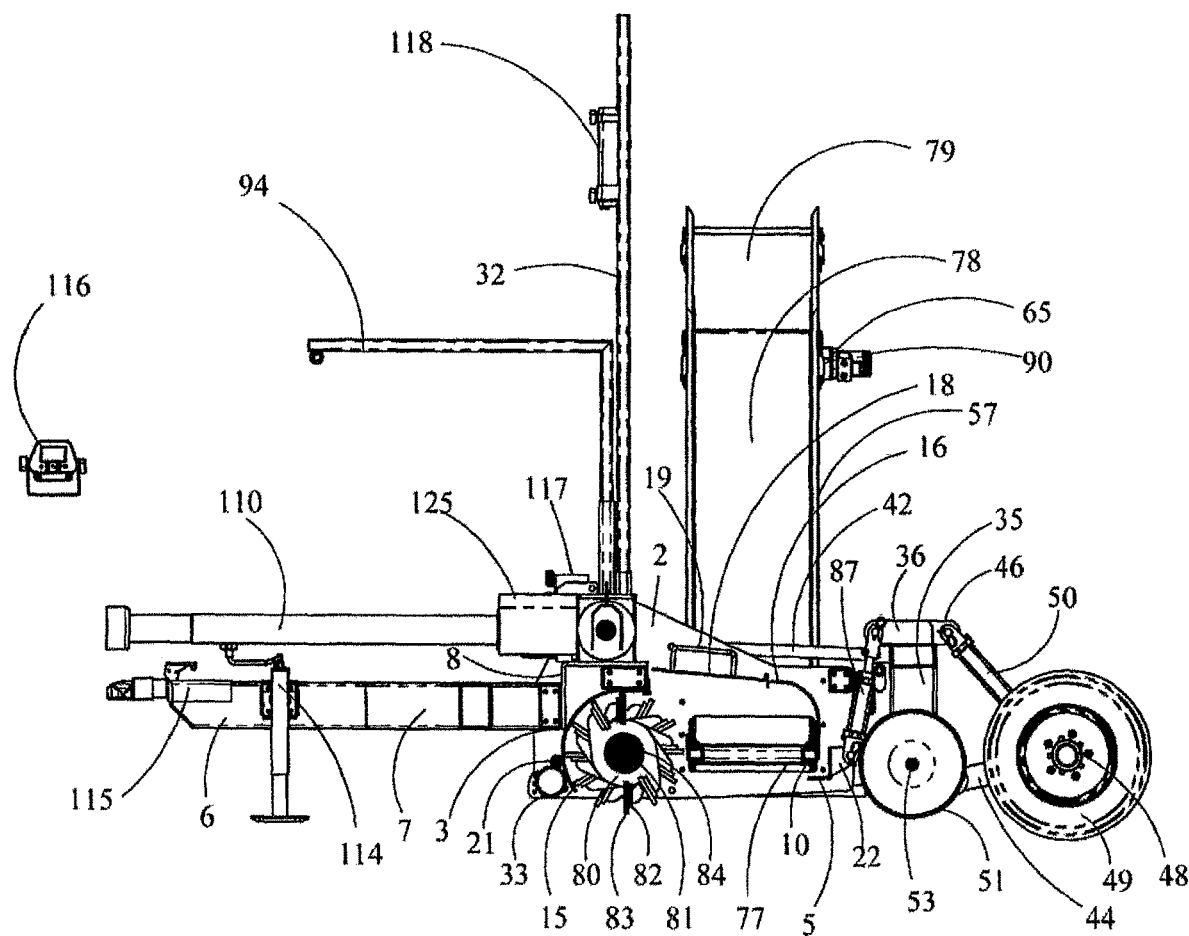
FIG. 6 is a partial cut-away view of the left-hand side of a turfplaner.

The cutters are preferably arranged in a helical fashion around the cutter head shaft. This provides an optimum cutting operation. It is preferred that the cutter rotate such that the cutter approaches the turf moving towards the direction of travel. In the present illustrations the cutter shaft would rotate clockwise as viewed from the left-hand side of FIG. 6. This direction of rotation is desirable for several reasons. One reason is an improved cut. Another reason is that the material removed by the cut is transported by the cutters and deposited on a conveyor which will be described further herein. Material is prohibited from falling to the front of the cutter by a front cutting head cover, 15, and associated brace, 21.

Figure 17:
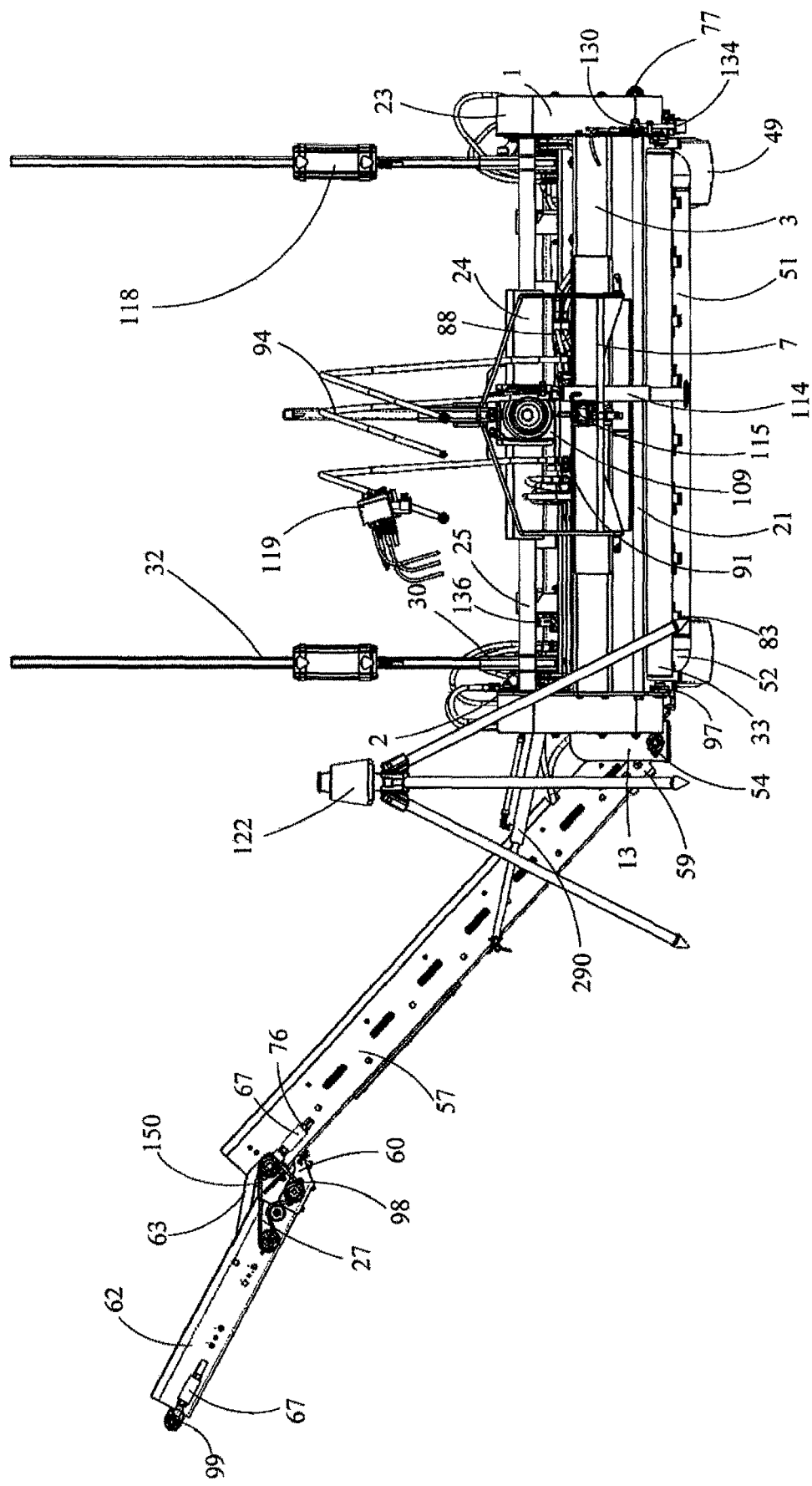
FIG. 17 is a front view of a turfplaner.
Figure 19:
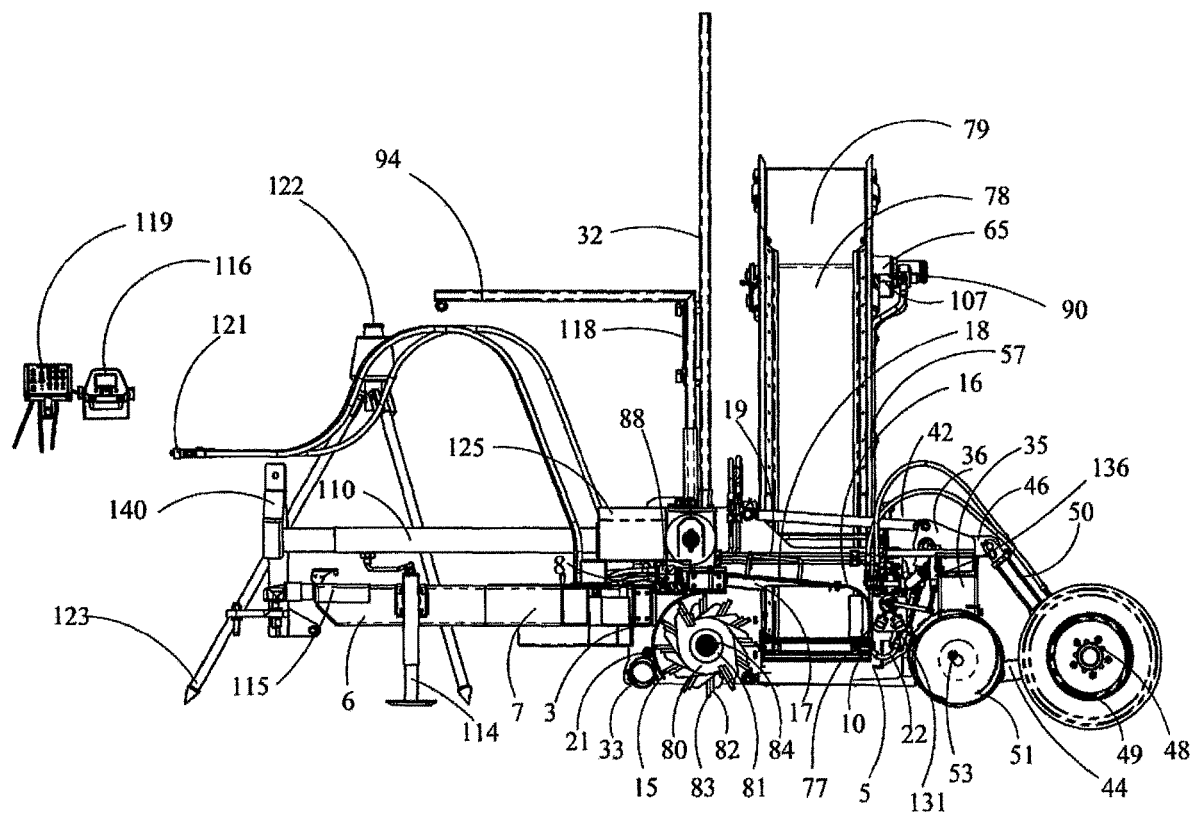
FIG. 19 is a partial cut-away view of the left side of a turfplaner.
Figure 20:
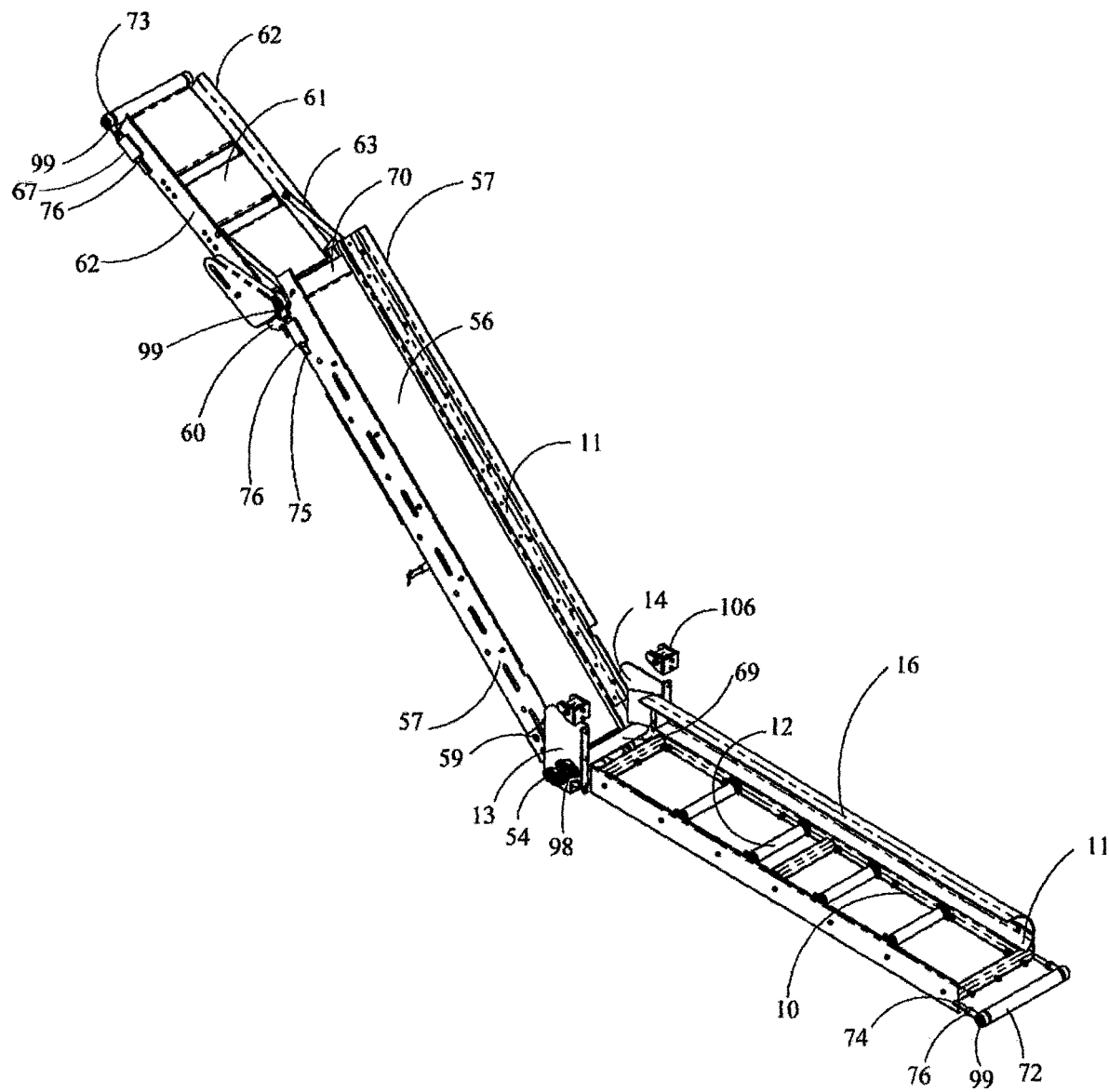
FIG. 20 is a perspective view of a conveyor of the turfplaner.

The conveyor assembly will be described with particular reference to FIGS. 1, 10, 17 and 20. The conveyor assembly is illustrated in isolation in FIGS. 10 and 20 and some of the belts are removed for clarity in FIG. 20. The conveyor comprises multiple continuous conveyor belts. For convenience, the conveyor is described as being in three discrete units even though components could be combined or additional conveyor components added. The three components are referred to as the primary conveyor, which removes material from the interior of the turfplaner, an elevator conveyor which raises the material to a height sufficient to be dumped into a support vehicle, and an extension conveyor, which allows the tow vehicle to move beside the turfplaner at a safe distance. A primary conveyor belt, 77, preferably just behind the cutting assembly, transits material from the interior of the turf planer and deposits the material on a conveyor elevator belt, 78, which then transports the material and deposits material on a conveyor extension belt, 79, wherein it is transported to a terminal area wherein it is preferably received by a support vehicle. A conveyor frame (see FIG. 6), provides a support structure for the primary conveyor assembly with rollers, 12 and 69, there between. Primary conveyor belt, 77, is supported on one end by a conveyor idler roller, 72, which rides in a conveyor hanger bearing, 99, and on the other end by a conveyor drive roller (not visible) which is driven by a conveyor hydraulic motor, 89. In another embodiment the conveyors would be driven by coupling to the PTO through a gear and chain assembly or the like. The conveyor hanger bearing is attached to the frame by a conveyer hanger bearing rod, 74, which allows adjustment of the idler roller to insure the belt does not wander perpendicular to the idler roller during use. Opposite the conveyor idler roller, 72, the conveyor belt, 77, is supported and driven by a drive roller which is mounted in conveyor bearings, 98, and activated by a conveyor hydraulic motor, 89. Alternatively, a drive belt, 150, can be employed as illustrated in FIG. 17. A conveyor elevator cylinder bracket, 106, is illustrated in FIG. 20 which would be the point of attachment of a conveyor elevator cylinder (290 in FIG. 14). The conveyor belt is supported by a conventional conveyor bed plate (not shown). The conveyor bearings, 98, are secured to conveyer sides, 13 and 14. A conveyor deflector, and rear conveyor cover, 16, insure that the material removed by the cutters remains on the conveyor belt. A conveyor cover, 18, with a handle, 19, for manipulating the cover is provided to prohibit material from leaving the conveyor and for aesthetics. An optional conveyor cover support angle, 17, is illustrated in FIG. 19.

The conveyor elevator transports material from the primary conveyor to the conveyor extension. The conveyor elevator comprises a conveyor elevator frame, 54, (see FIG. 12), and a conveyor elevator bed, 56, which supports the conveyor elevator belt, 77. The conveyor elevator has sides, 57, and a belt guard, 58, for safety and to prohibit material from falling from the belt. The conveyor elevator frame is mounted by a conveyor elevator pivot bracket, 59, which is attached to conveyor mounting plates, 29. The conveyor elevator belt is strung on a conveyor elevator idler roller, 73, which is attached by a conveyor elevator hanger bearing rod, 67, and aligned by a conveyor adjuster nut, 76. A second conveyor hydraulic motor, 90, provides rotational power to the elevator belt through a drive roller, 65. The conveyor hydraulic motor, 90, may be attached through a coupler as illustrated at 107 of FIG. 19. In one embodiment, a single hydraulic motor can be employed yet two are preferred for enhanced control.

Figure 1:
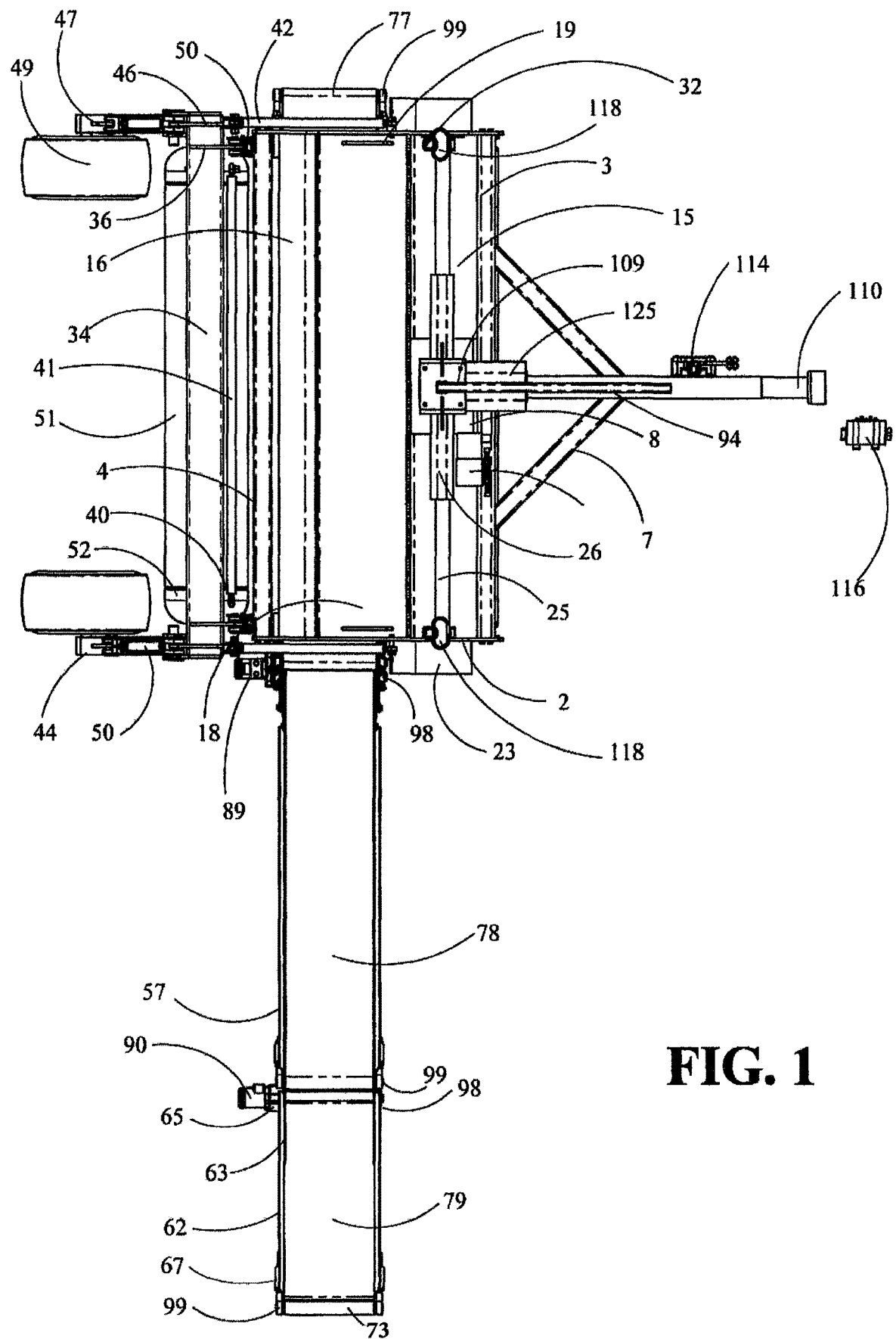
FIG. 1 is a top view of a turfplaner.
Figure 2:
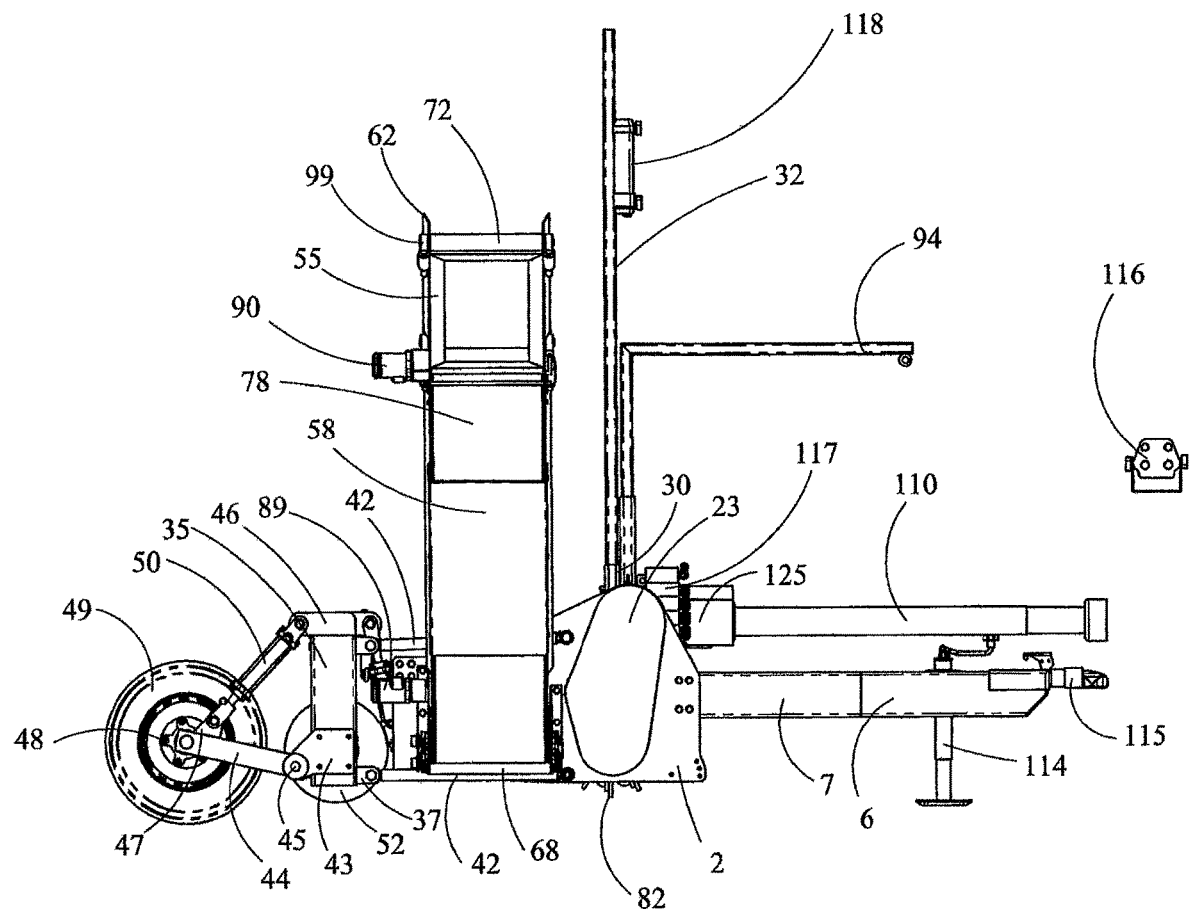
FIG. 2 is a right side view of a turfplaner.
Figure 3:
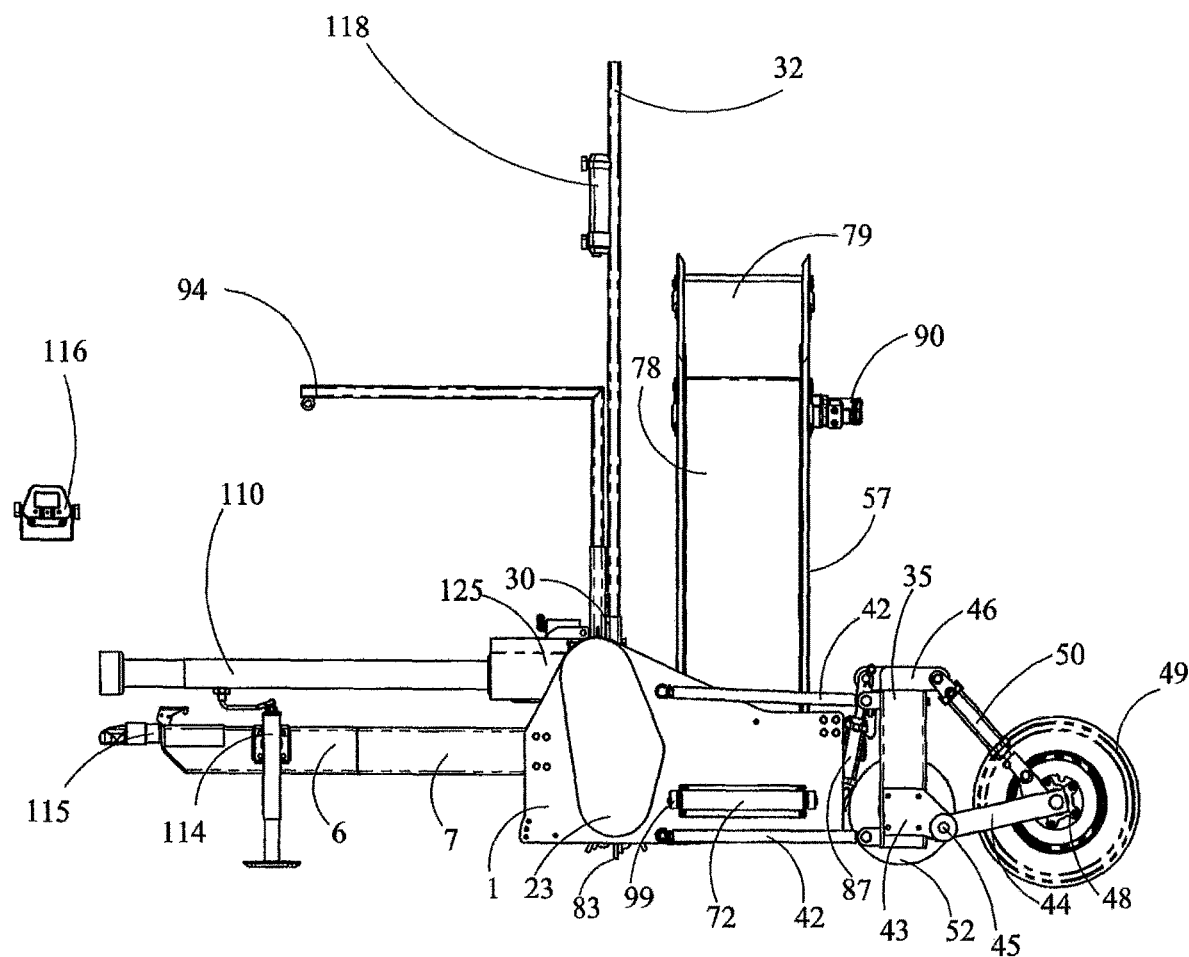
FIG. 3 is a left side view a turfplaner.
Figure 4:
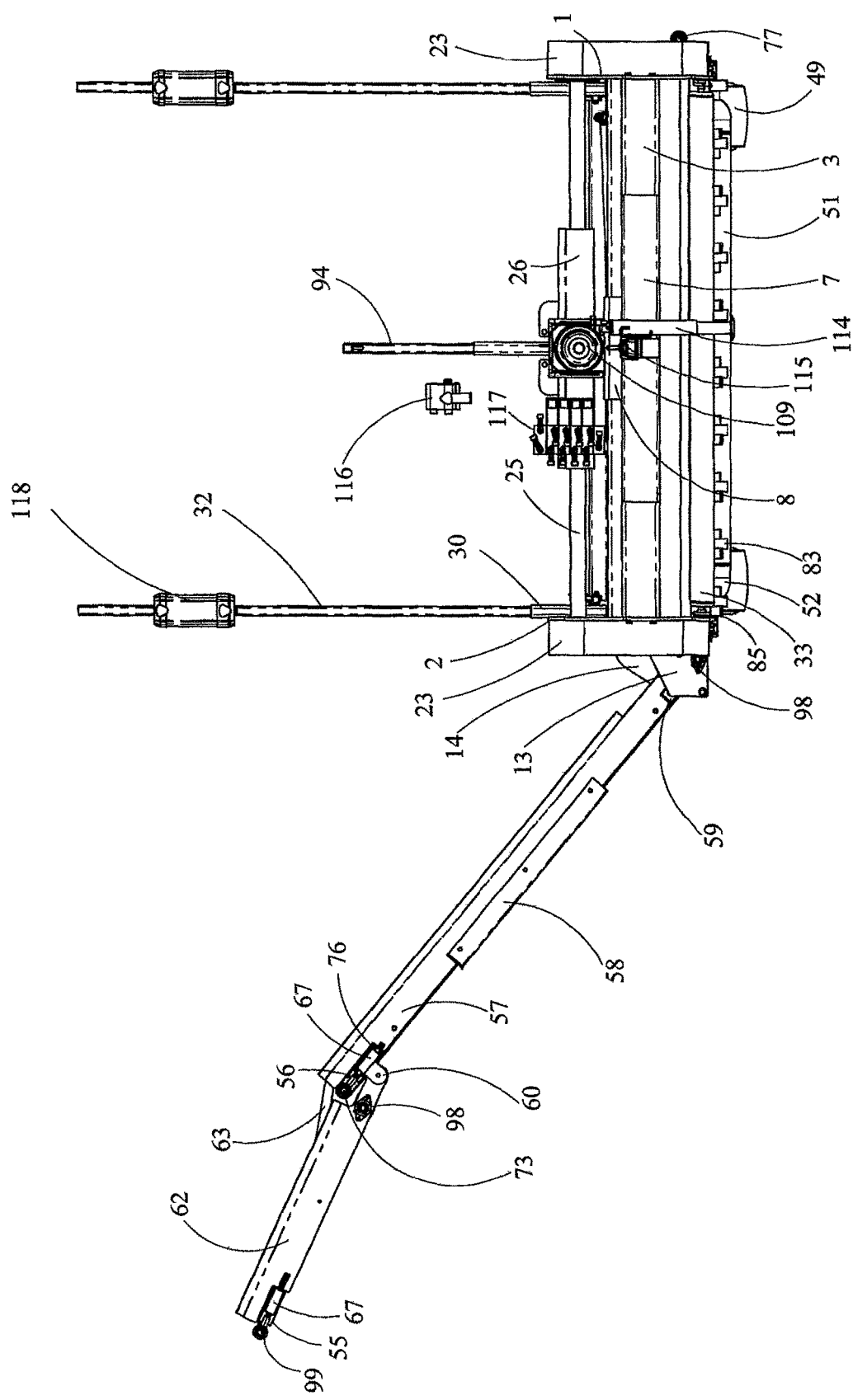
FIG. 4 is a front view of a turfplaner.
Figure 5:
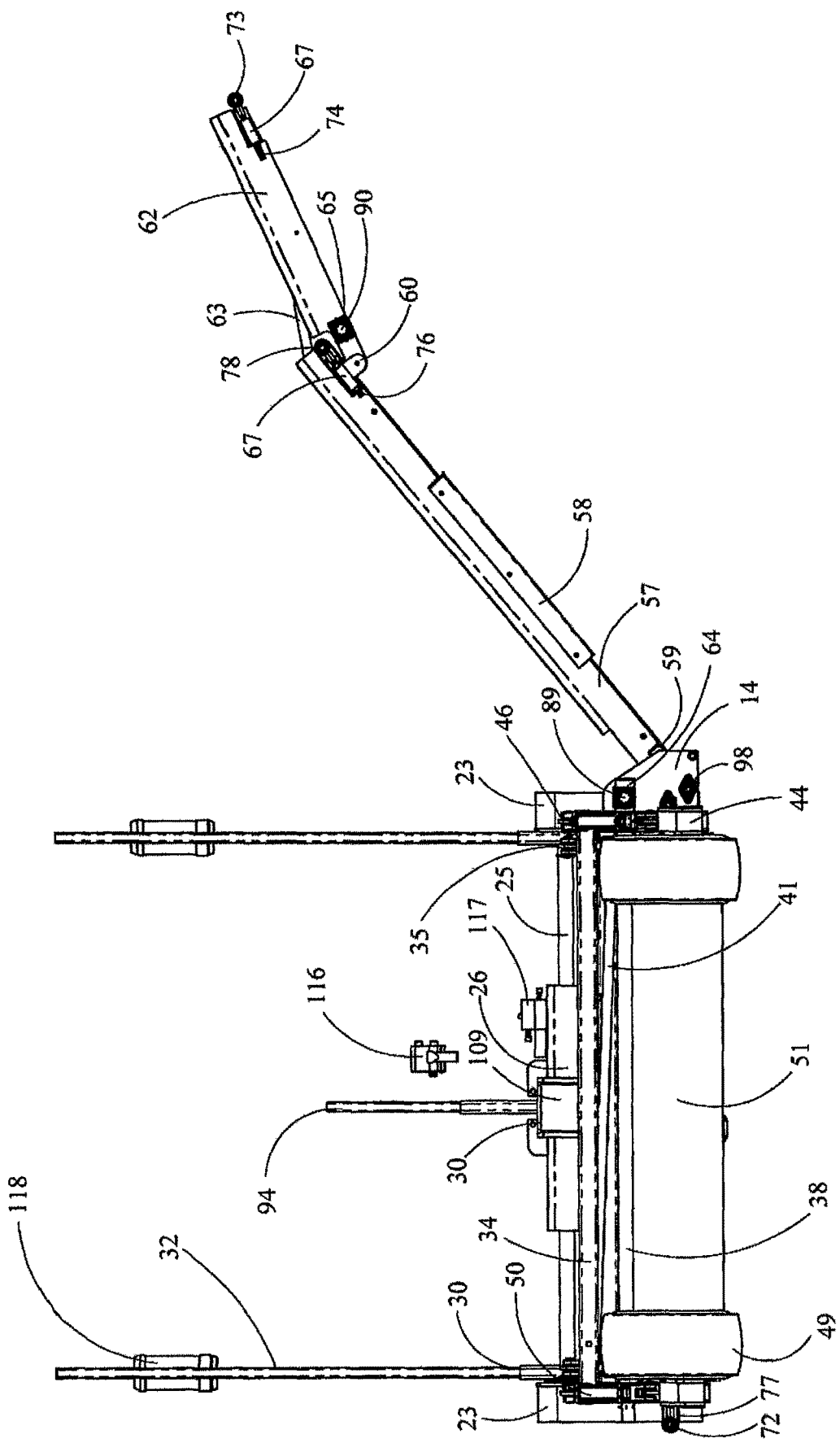
FIG. 5 is a rear view of a turfplaner.

The conveyor extension is mounted to the conveyor elevator at a conveyor extension pivot bracket, 60. The conveyor elevator has a conveyor extension bed, 61, for supporting the conveyor elevator belt and is bound on the sides by conveyor extension sides, 62. Conveyor extension supports, 63, are preferably provided if necessary, all supported by a conveyor extension frame, 55 (see FIG. 2). A conveyor elevator spacer, 68, is provided if necessary to avoid insufficient clearance between components and, particularly, between belts rotating in non-synchronized fashion.

A transport assembly is provided, preferably, at the rear of the turfplaner. The transport assembly comprises wheels for inoperative transport and a roller which is operational during planing. The transport assembly will be described with particular reference to FIGS. 1-3, 5, 6, 9 and 12. The transport assembly comprises a roller frame top, 34, and roller frame sides, 35, generally in the form of an inverted "U" which, taken together, comprise the main frame. A cylinder roller bracket, 36, is mounted on the roller frame top. A transport hydraulic cylinder, 50, connects the cylinder bracket roller frame, 36, to a roller tankhead, 52, which functions to lower and raise the roller pipe, 51, into and out of engagement with the ground. The roller pipe, 51, is mounted on a roller shaft, 53, which is attached on either end to the roller tankhead, 52. A roller suspension frame mount, 37, on either side attached to the roller frame side, 36, connects the lower extent of the transport assembly to the frame sides, 2 and 3, through upper and lower suspension links, 42, via a suspension link tie rod, 40. A suspension sway link, 41, is preferably provided to mitigate improper tracking. Transport wheels and tires, 49, are attached to the roller frame sides, 35, through a transport leg, 44, which receives an axle. The wheel is attached to the axle by a transport spindle and hub, 48. The transport leg is attached by a transport pivot pin, 45, at a transport pivot bracket, 43, on the roller frame side. A transport hydraulic cylinder, 50, spanning between a transport cylinder top bracket, 46, on the frame and a transport cylinder bottom bracket, 47, on the transport leg, 44, rotates the wheel into and out of engagement with the ground. A roller scraper, 38, removes any material adhering to the scraper thereby providing a continuous smooth scraper surface. The roller scraper is preferably attached to the roller tankhead, 52, by roller scraper mounts, 38. During use the roller is in engagement with the ground and functions to smooth any undulations remaining from the cutter. During transport the roller is not engaged and the turfplaner is transported on the wheels.

A particular feature of the instant invention is the laser or GPS guidance system which is coupled with the hydraulics through a hierarchical controller 119 to maintain the cutter of the turfplaner at a preferred height relative to the laser beam or GPS signal in one mode of operation as will be more fully described herein. In prior art methods, the leveling is typically dictated by a monitor based on gravity, such as a bubble level, on the machine. Each pass is therefore uncorrelated to the previous pass with regards to depth of cut. With the present invention a laser with a planar light or GPS is set up preferably beyond the location being leveled. Sensors on the turfplaner detect if they are above or below the planar light and adjust the cutter accordingly during use. Therefore, the cutter can be maintained at a preferred height, relative to the laser, and each pass across an area can be correlated in identical fashion to the laser if within certain limits as will be described. Furthermore, the direction of travel is not relevant. Regardless of where the turfplaner is located, the cutter can be maintained at a preferred height relative to the planar fan beam as long as the planar laser light can be received.

Laser proportional receivers or GPS receivers, 118, are slidably attached to a laser mast, 32, which is attached to the turfplaner frame by a mast mount, 30. The mast mount is attached to the turfplaner to move in concert with the cutter as would be realized from the description herein. A laser or GPS control, 116, is preferably situated in a convenient location such that the laser or GPS proportional receivers can receive the beam from the laser control or GPS signal over the entire area being planed. The laser or GPS proportional receivers are then slid up or down on the mast and preferably reversibly fixed. The distance between the laser or GPS proportional receiver and cutter is therefore fixed and the height of the cutter is adjusted to maintain the laser or GPS proportional receiver at the predetermined level relative to the laser or GPS signal.

The GPS system can be either "indicate only" or "fully automatic". Both systems can utilize one or two GPS receivers. Using only one GPS receiver limits how the guidance system can orient the turfplaner's position with respect to the desired profile. Using two GPS receivers gives the guidance system two points of position allowing it to calculate what angle the turfplaner is on relative to the desired profile.

The accuracy of "indicate only" systems is affected by using a base station that can relay site specific corrections. If the site does not have a base station, indicate only systems can just use satellite information, however the accuracy is usually in the one to two meter range. Utilizing a base station allows for site specific corrections to be transmitted to the machine, increasing the accuracy through Real Time Kinematics (RTK). Site specific corrections can increase the accuracy of "indicate only" systems to be around two to three centimeters.

"Fully automatic" systems allow the turfplaner's implements to be controlled by the GPS guidance system. This is typically used in the fine grading applications where precise levels of material need to be moved on a predetermined desired profile. Accuracy is improved from "indicate only" systems using GPS and RTK, but requires an onsite base station. These systems can use either one or two GPS receivers and are mounted on the turfplaner's mast. The more advanced systems use two receivers since it allows the turfplaner to be controlled in a three-dimensional desired profile. Fully automatic systems have the GPS guidance system integrated in the turfplaner's hierarchical controller 119.

Figure 13:
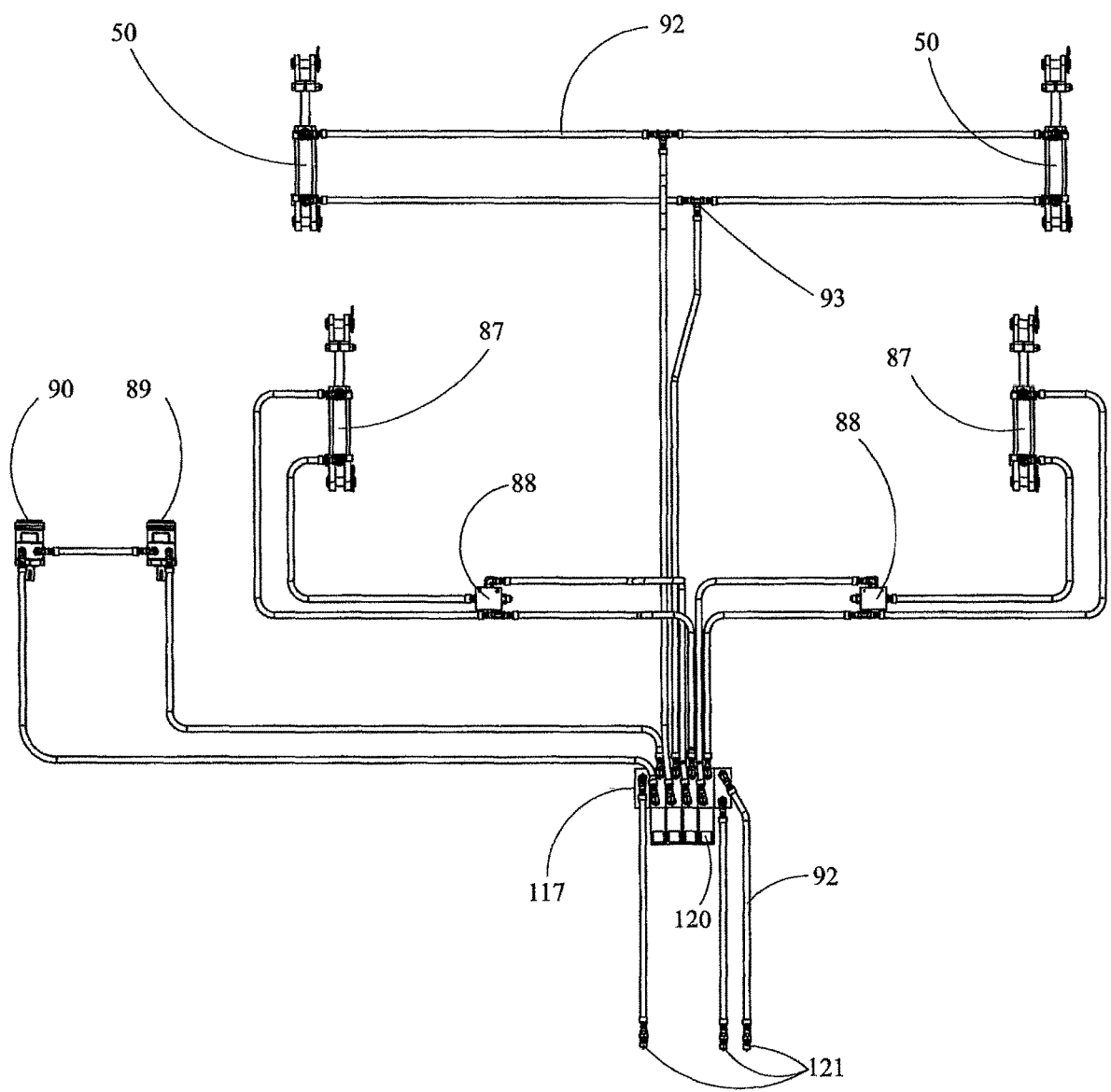
FIG. 13 is a view of the hydraulic control system of a turfplaner.
Figure 23:
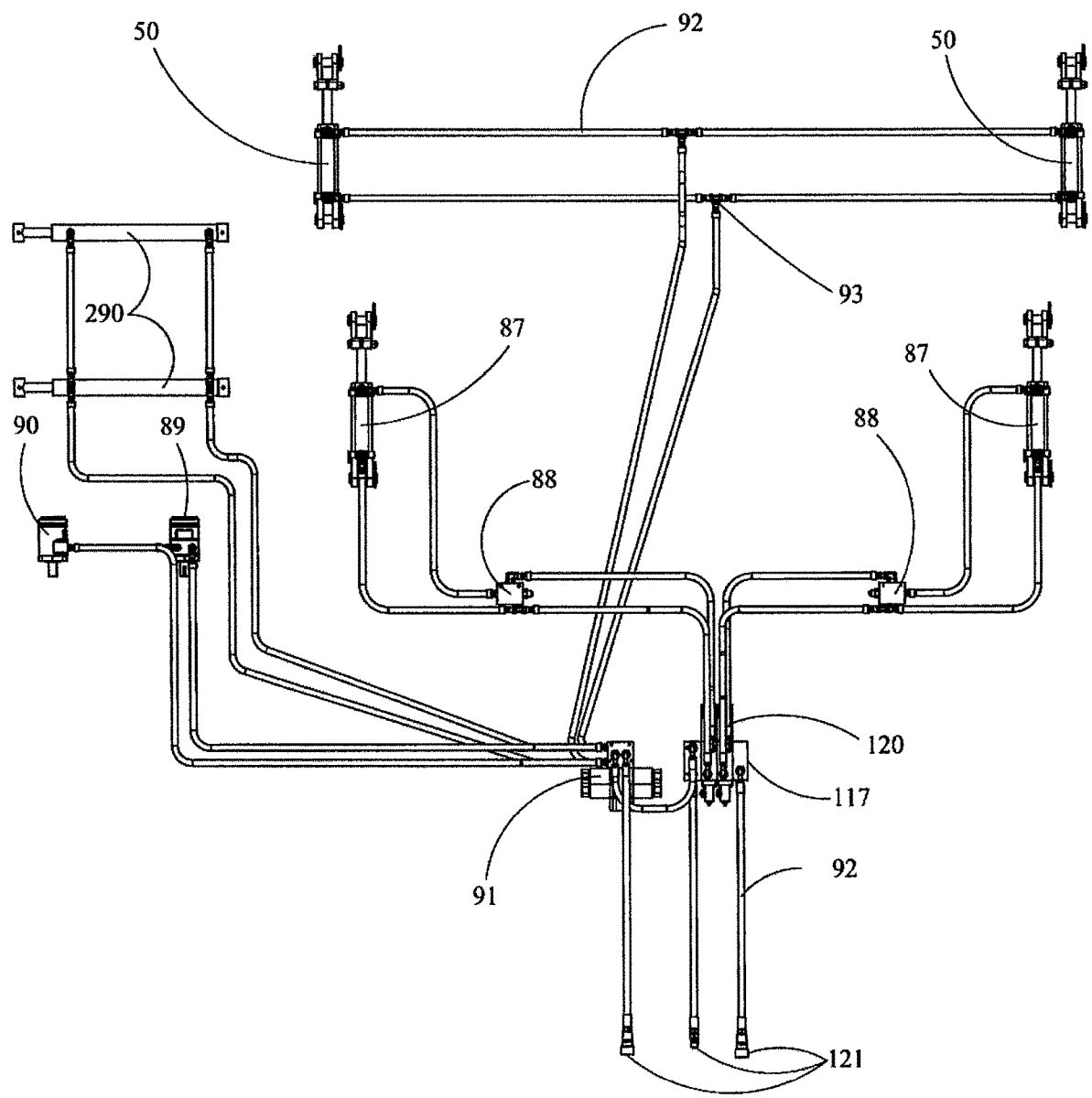
FIG. 23 is a view of the hydraulic control system of a turfplaner.

The cutter, transport assembly, and conveyors are preferably all controlled by a common hydraulic system which is illustrated in isolation in FIGS. 13 and 23. In one embodiment the hydraulic proportional valves, 117, react in a subservient manner to a electric solenoid, 120, to control the height of the cutting head in response to a signal from the hierarchical controller. The hydraulic system for the turfplaner is preferably subservient to the hydraulic system of the tractor and supplied through hydraulic hoses, 92, with appropriate junctions, 93, attached to the tractor hydraulic system through standard tractor hydraulic connectors, 121. The conveyors are manipulated by the conveyor hydraulic motor, 89, and conveyor elevator hydraulic motor, 90. The machine control hydraulic cylinders, 87, attached to a bracket, 22, functions as a lift mechanism to control the height of the cutter relative to the trailing roller pipe, 51, which is on previously cut turf with a hydraulic counterbalance valve, 88, located in each circuit for control purposes as would be readily understood. The transport assembly is manipulated by the transport hydraulic cylinder, 50, conveyor hydraulic motor, 89, and conveyor elevator hydraulic motor, 90. A hydraulic triple control valve, 91, can be used to control conveyor lift hydraulic cylinders, 290. The hydraulics are controlled by a hierarchical controller.

In some instances the desire is to conform an adjacent area or existing structure such as a sidewalk, drive surface, curb, aesthetic surface, hardscape or the like. For example, in the case of a sports field within a track it is highly desirable to provide an autograding device to avoid any deviation from the level of the track and the playing surface adjacent thereto. It would be most desirable to have the first pass of the turfplaner match the level of the track at the interface with the track and have a smooth transition from the interface to the side of the turfplaner furthest from the track. A path the width of the turfplaner would therefore represent a slope, relative to a perpendicular to the track, which is predetermined. The side of the turfplaner opposite the track may be controlled by a laser or GPS, as described above, or an autodepth device may be employed, as will be more fully described herein. In subsequent passes the autograding can be used to match the contour of a previous pass and the other side of the turfplaner can be controlled based on the laser or GPS or an autodepth device.

Figure 14:
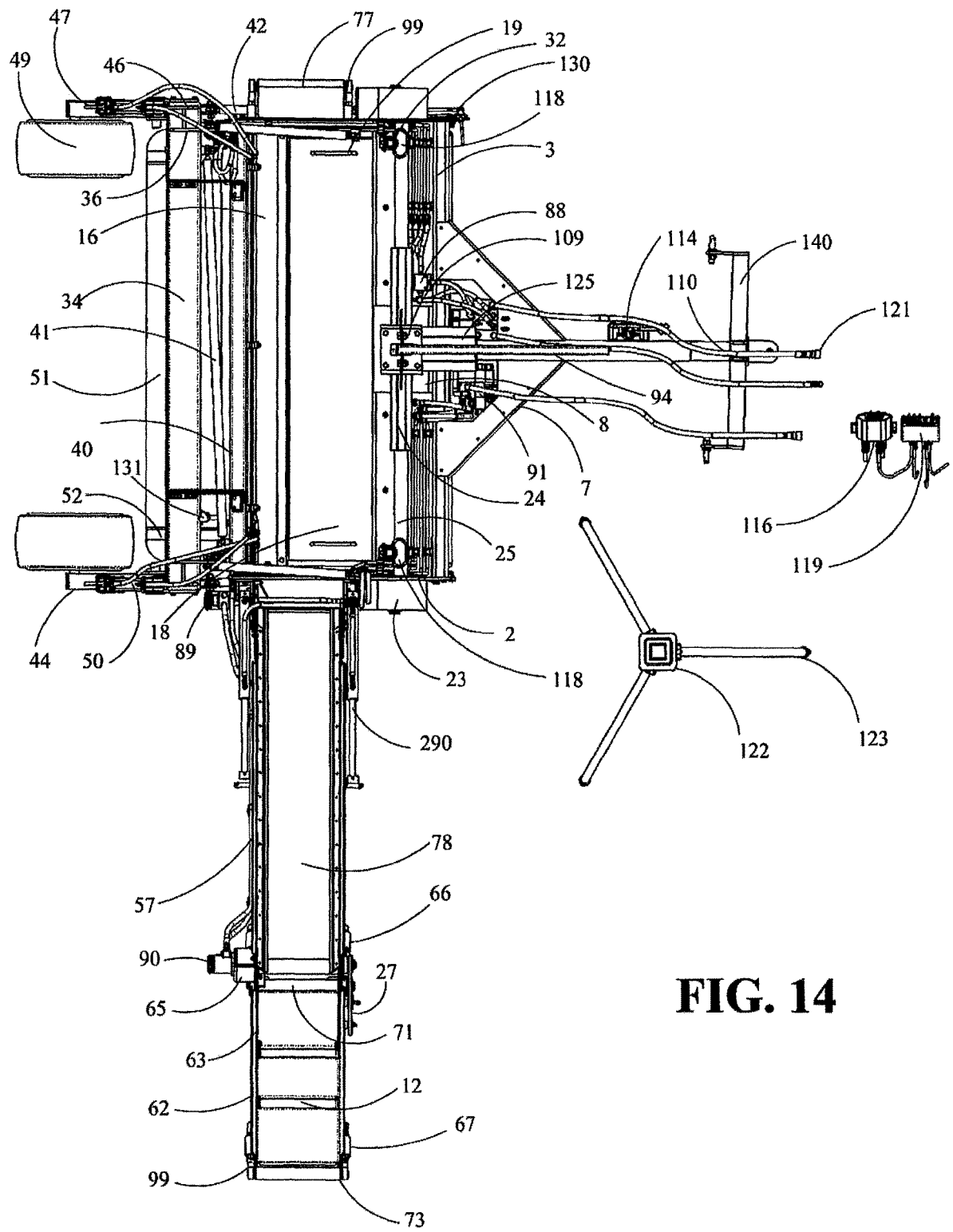
FIG. 14 is a top view of a turfplaner.
Figure 15:
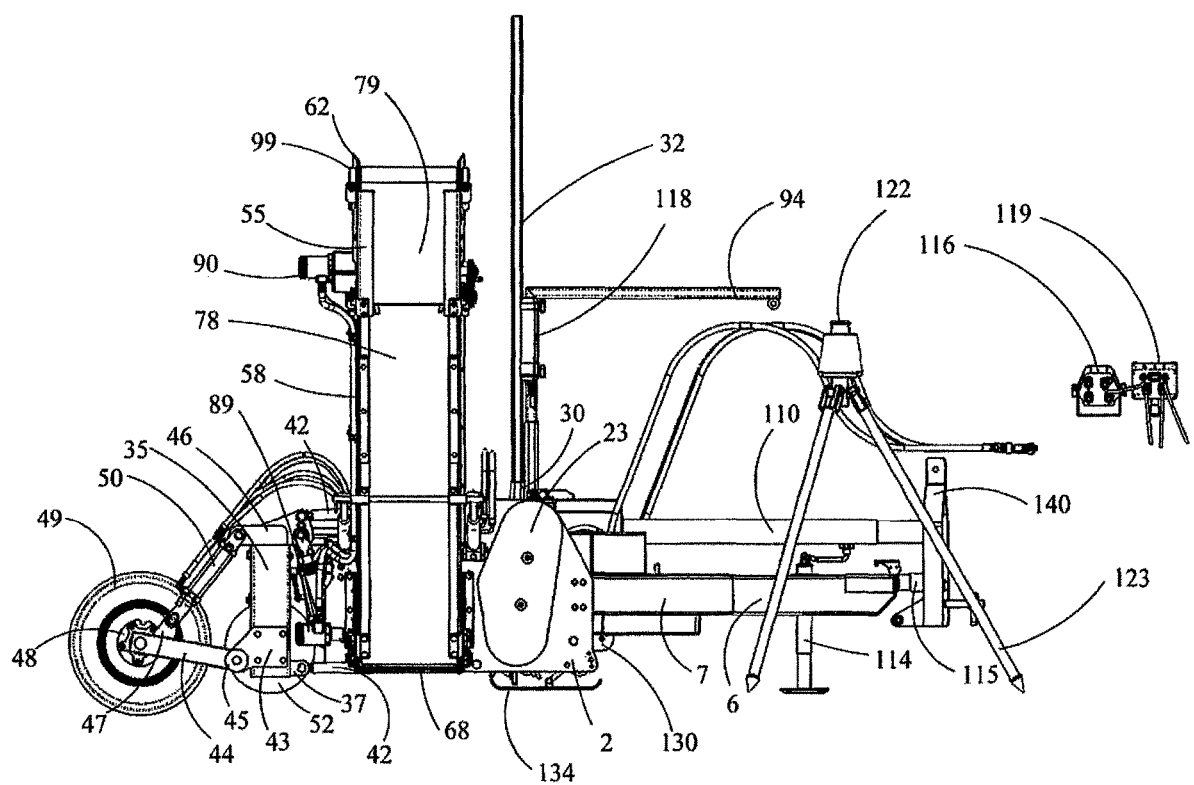
FIG. 15 is a right side view of a turfplaner.
Figure 16:
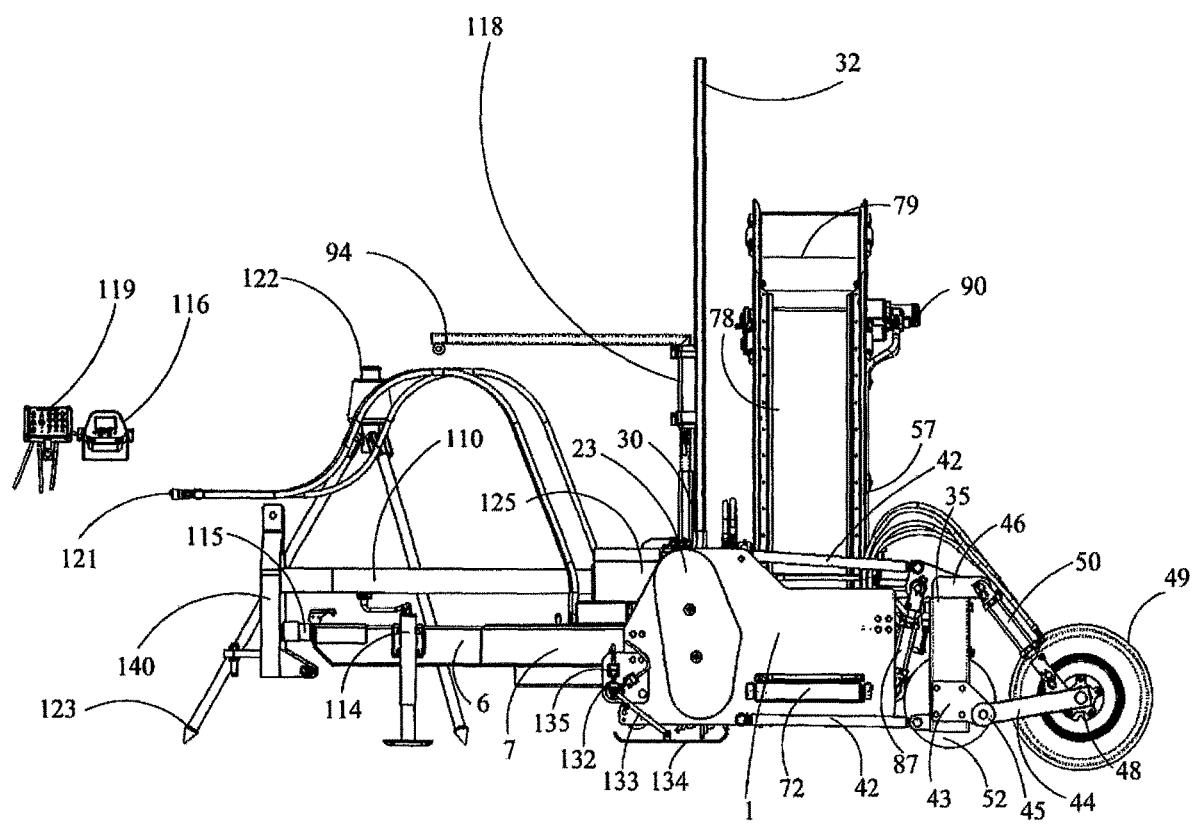
FIG. 16 is a left side view of a turfplaner.
Figure 18:
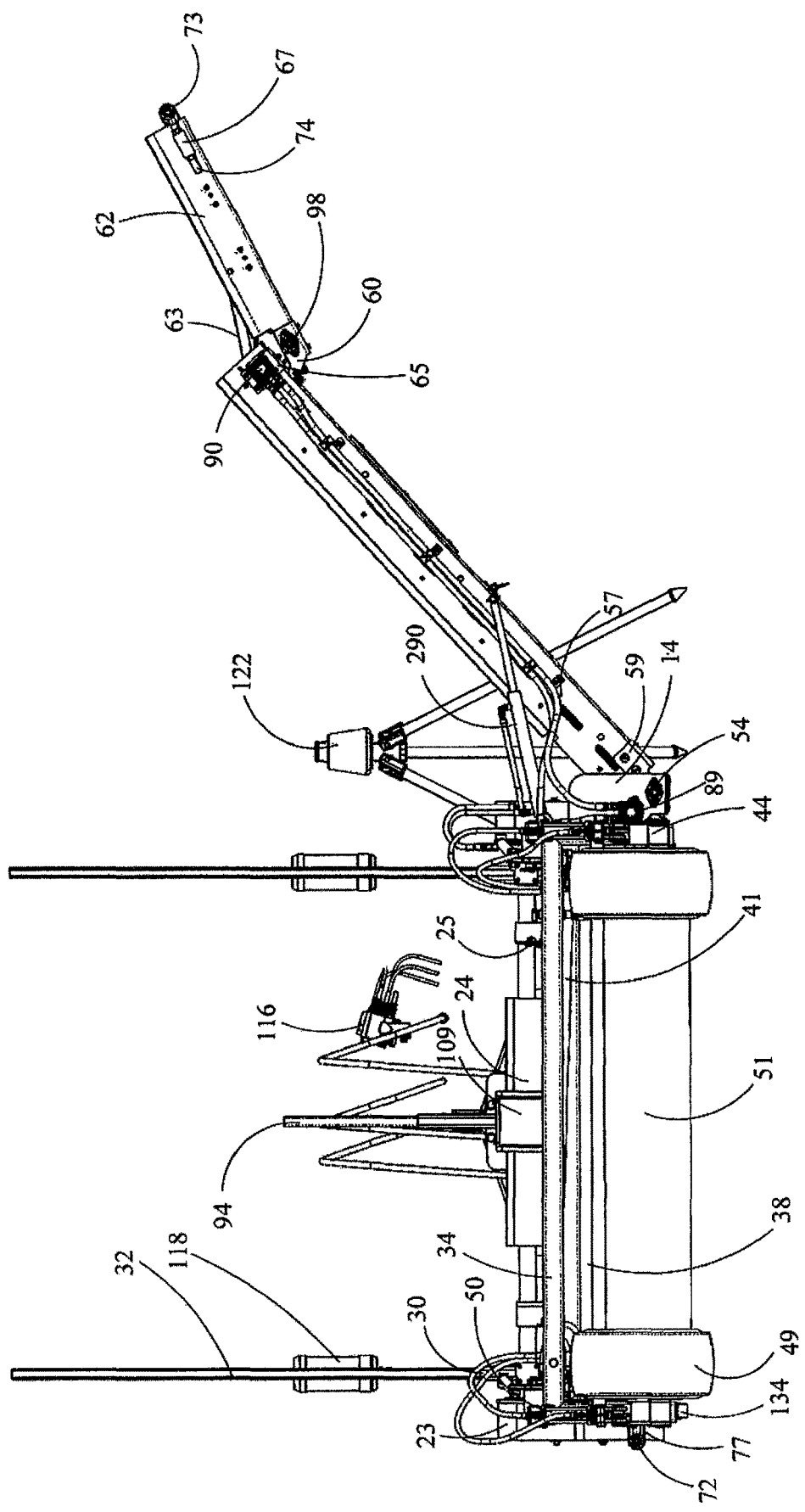
FIG. 18 is a rear view of a turfplaner.

A turfplaner is illustrated in top view in FIG. 14, in side view in FIGS. 15 and 16, in front view in FIG. 17 and rear view in FIG. 18. A conveyor lift hydraulic cylinder, 290, provides for hydraulic lifting of the conveyor. A slope/cone laser, 122, and preferred tripod, 123, provide a planar laser signal which is received by the laser proportional receiver(s), 118, when lasers are used. A hierarchical controller, 119, controls the device by monitoring a combination of laser or GPS proportional receivers, autograde sensors and autodepth sensors with appropriate signal to the hydraulics to maintain the turfplaner at the proper level on each side. A 3-point hitch adapter, 140, allows the device to be easily integrated with the typical three-point hitch system of a tractor. The autograde device, 130, and autodepth device, 131, will be described in more detail below.

Figure 24:
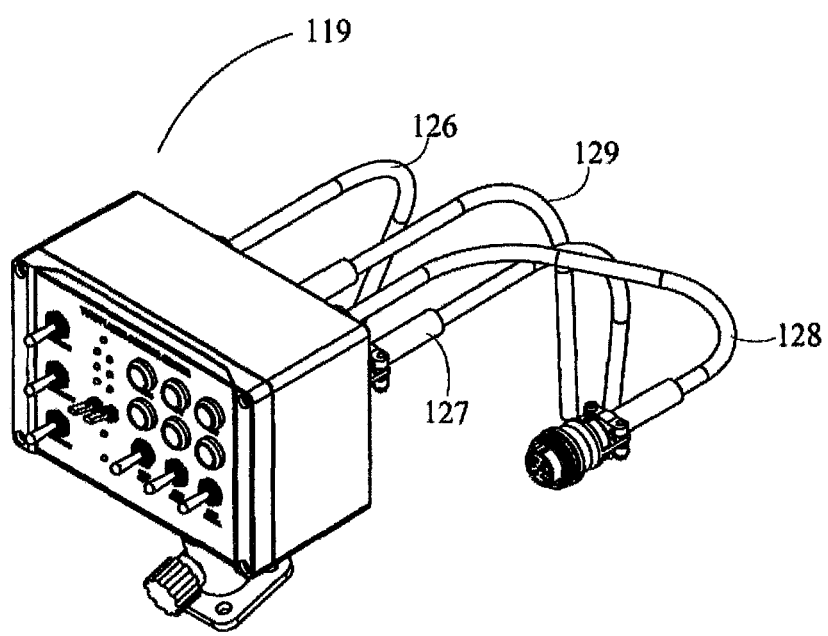
FIG. 24 is a view of the hierarchical controller of an embodiment of the turfplaner.

An embodiment of the hierarchical controller, 119, is illustrated in isolated view in FIG. 24. Electronic control devices such as the Danfoss Plus+1 controllers and modules can be programmed using PLC language or other suitable code, to perform the hierarchical control functions described herein. In FIG. 24, the hierarchical controller has a power cable, 126, for providing power to the hierarchical controller. A sensor cable, 127, receives signals from the various sensors, including at least one position sensor on each control hydraulic cylinder, 87. Cables 128 and 129 are interface cables with one interface to the laser or GPS control and one interface to the control valves for the control hydraulic cylinders 87.

Figure 25:
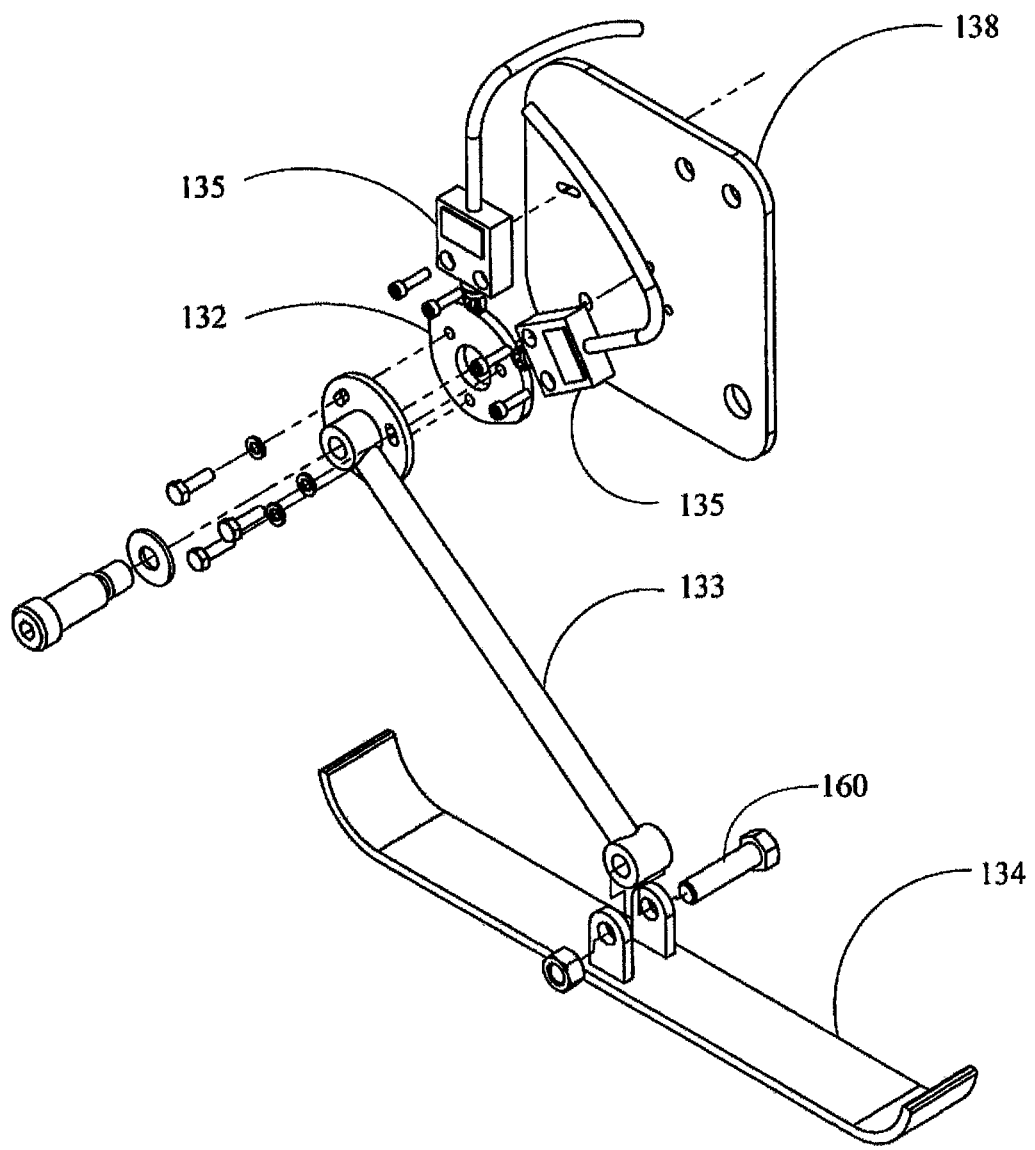
FIG. 25 is an exploded perspective view of an embodiment of the autograde of the turfplaner.

An autograde device 130 is illustrated in perspective exploded view in FIG. 25. An autograde mounting bracket, 138, affixes the autograde device to the turfplaner preferably, in a position to be near the edge of the most outbound cutter on the side opposite the conveyor. The autograde skid, 134, rides along existing structure the contour of which is to be mimicked by the adjacent surface being planed. The length of the autograde skid is chosen to be sufficiently long to traverse minor alterations, such as expansion joints, without alteration yet not so long as to traverse intentional contours. It is preferable that the autograde skid be at least about 15 cm (about 6 inches) to no more than about 61 cm (about 24 inches). Below about 15 cm minor undulations such as expansion joints or variations in the height of adjacent bricks may be realized. Above about 61 cm aesthetic contours may be artificially truncated. The autograde skid preferably has upturned ends, to insure that the skid rides on the surface. The autograde skid is mounted to an autograde link, 133, preferably with a pivot mount such as mating threaded members, 160, or the like. The autograde link is attached to, or integral to, an autograde cam, 132, which upon rotation activates at least one autograde microswitch, 135. The autograde microswitch relays alterations in contour to the hierarchical controller, 119, which activates the appropriate hydraulics to maintain the cutting head at the proper height. In the illustrated embodiment the autograde link is attached to the autograde cam by threaded members and associated washers as would be readily understood, however, any method of coupling movement of the autograde skid to a sensor would be considered within the scope of the invention.

Figure 26:
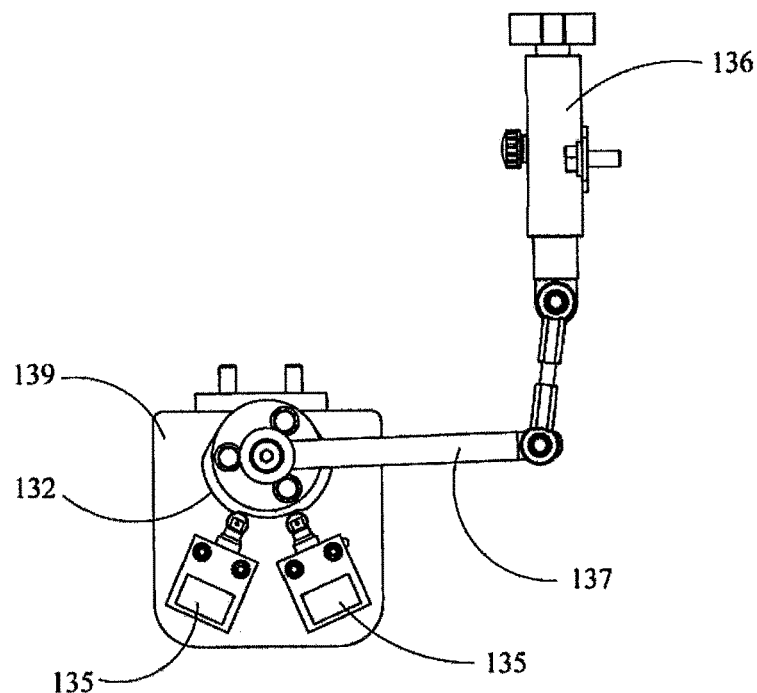
FIG. 26 is a side view of an embodiment of the autodepth control of the turfplaner.
Figure 27:
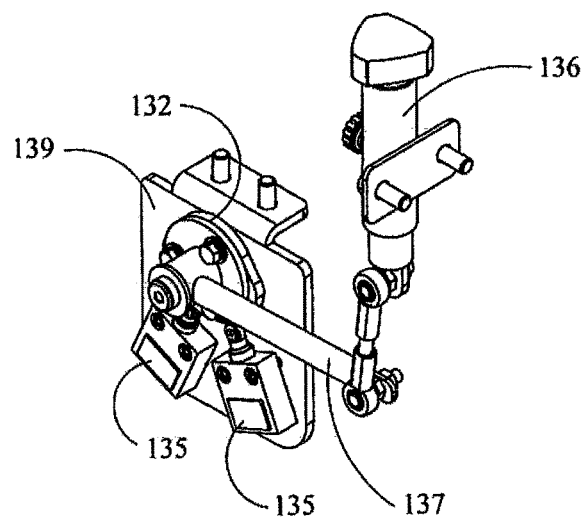
FIG. 27 is a perspective view of an autodepth control of the turfplaner.

An embodiment of the autodepth device is illustrated in side view in FIG. 26 and perspective view in FIG. 27. An autodepth adjuster, 136, fixes the desired height difference between itself and an autodepth bracket, 139, which is attached to a portion of the turfplaner which moves in concert with the roller pipe (52 of FIG. 15).

As the autodepth bracket moves up and down relative to the autodepth adjuster, 136, an autodepth cam, 132, interacts with autodepth micro switches, 135. The autodepth micro switches send a signal to the hierarchical controller which activates the appropriate hydraulics thereby returning the height of the cutter to the appropriate level.

Figure 28:
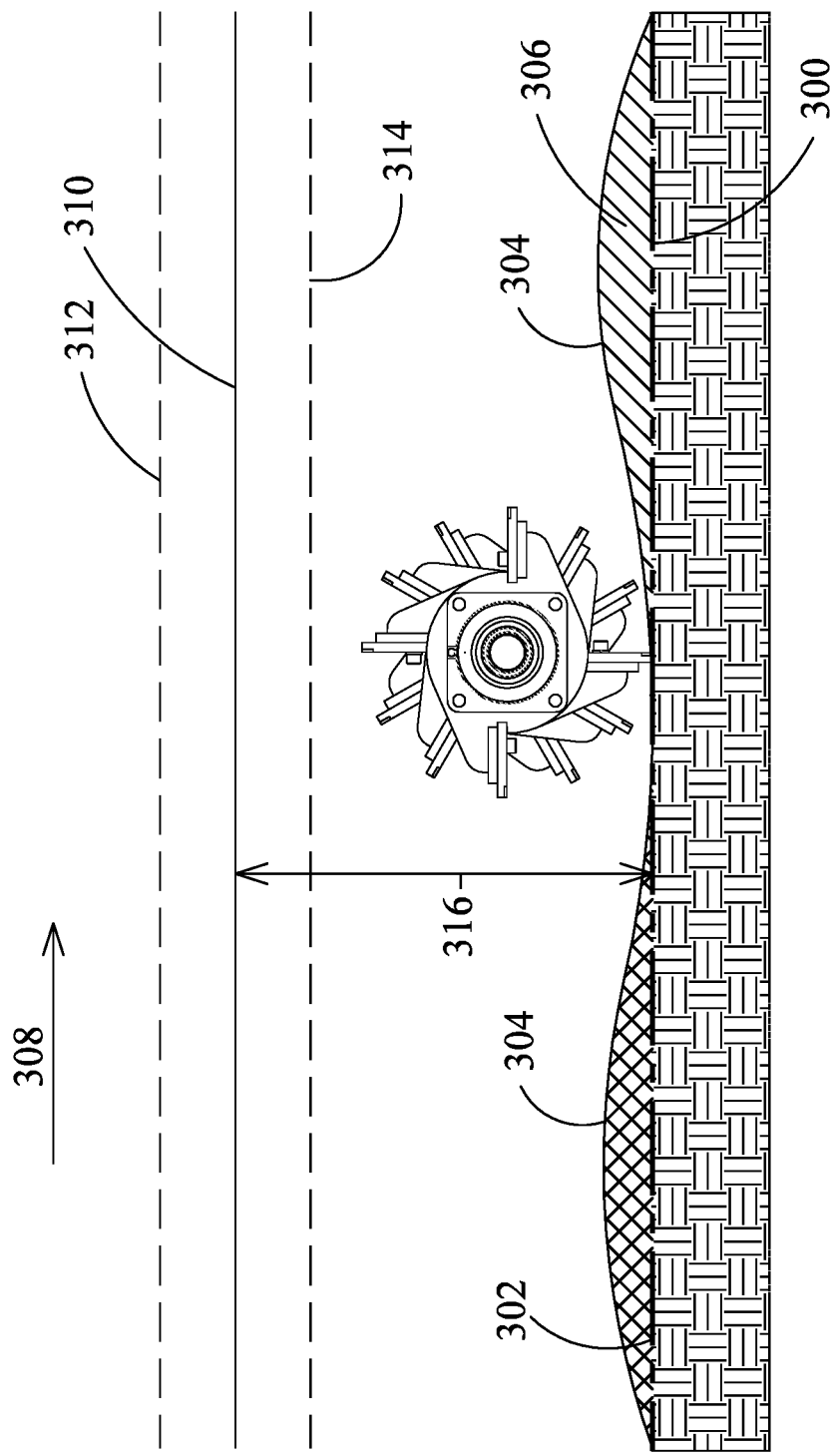
FIG. 28 is a cross-sectional schematic view illustrating an embodiment of the invention.
Figure 29:
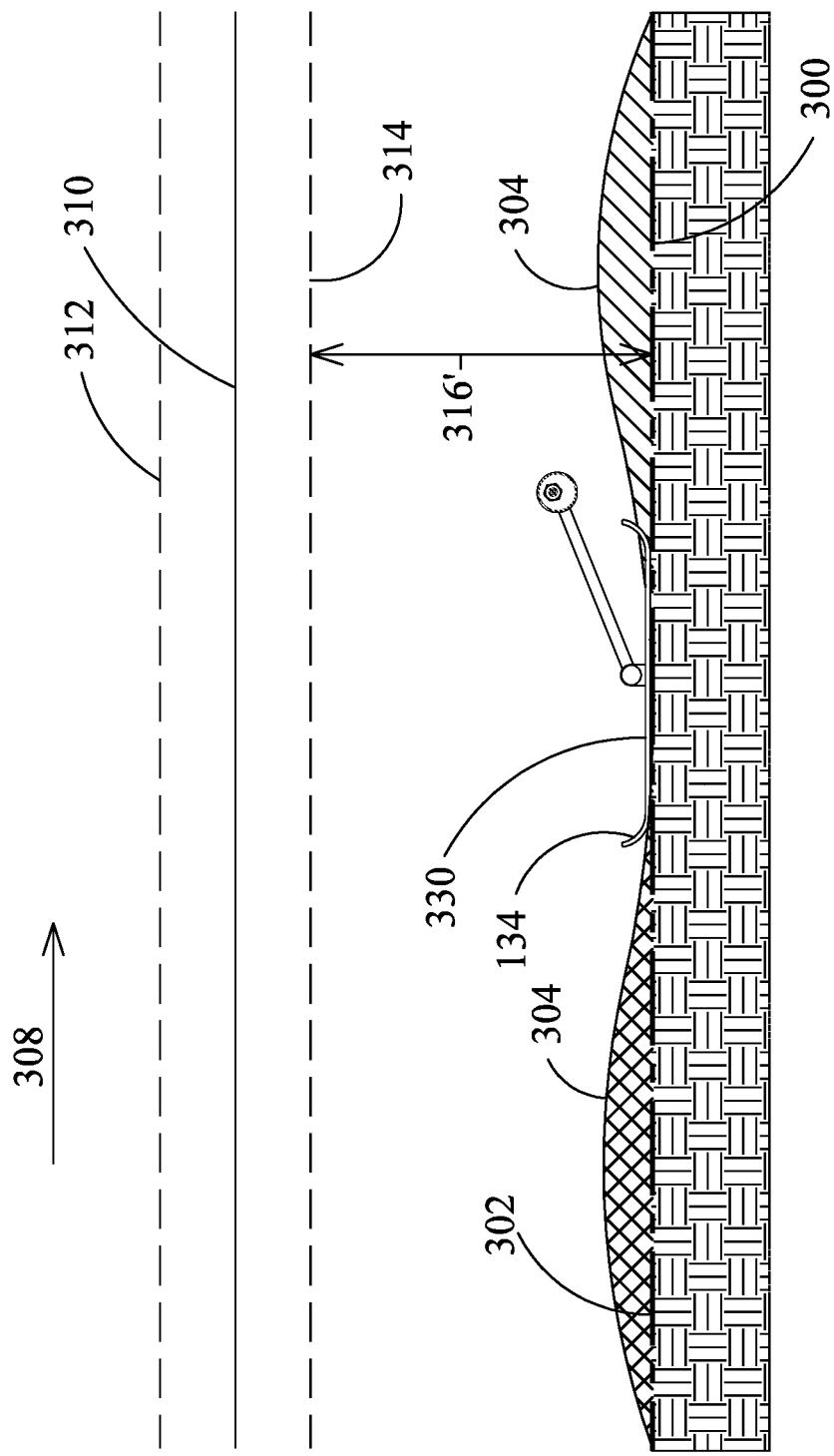
FIG. 29 is a cross-sectional schematic view illustrating an embodiment of the invention.
Figure 30:
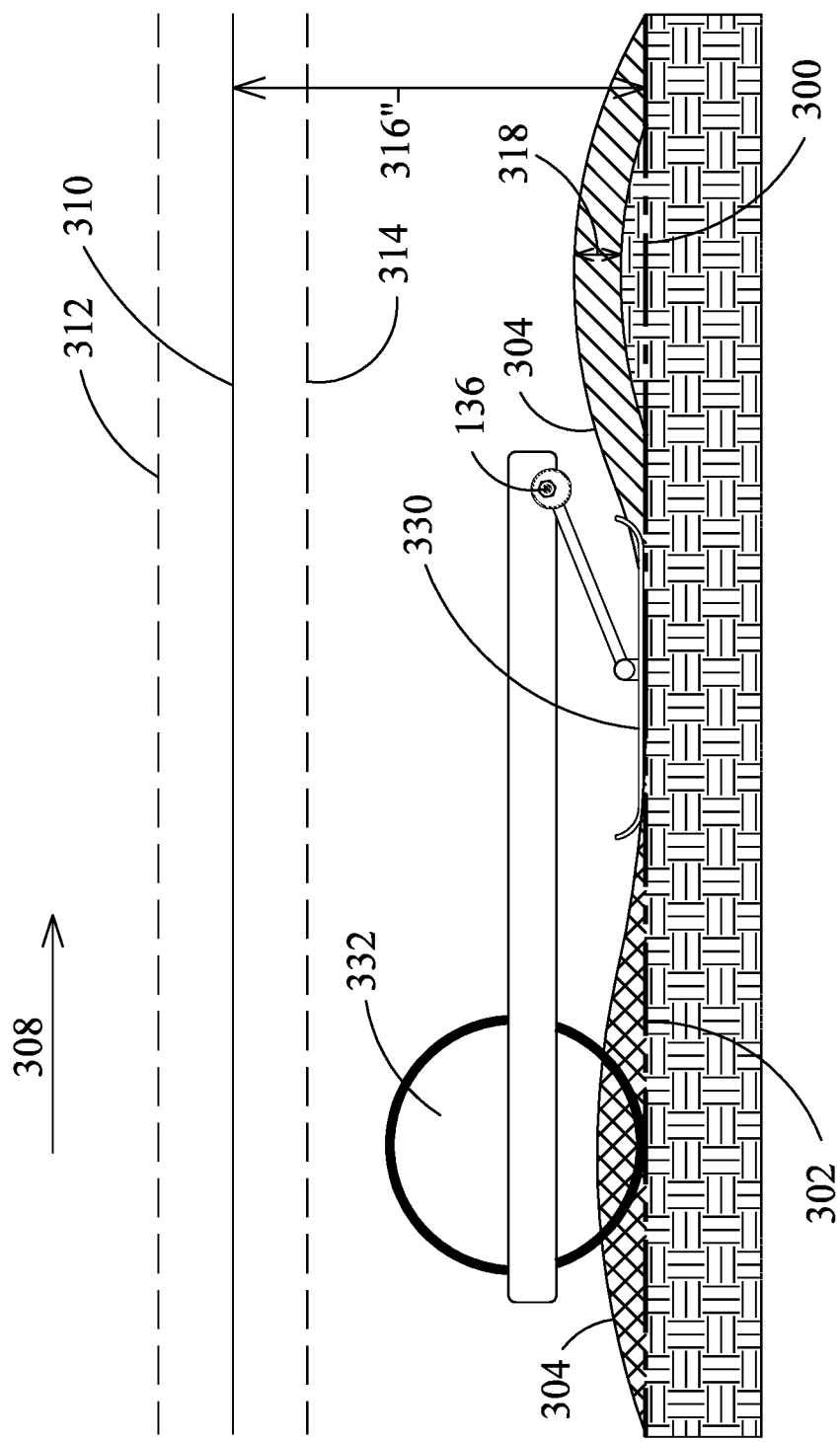
FIG. 30 is a cross-sectional schematic view illustrating an embodiment of the invention.

An embodiment of the invention will be described with reference to FIGS. 28-30 wherein a cross-sectional schematic view of a partially planed surface is illustrated. In FIGS. 28-30, the desired cut profile is indicated by line 300, which is followed in a parallel fashion by the previously cut or adjacent surface, 302, from either a previous pass of the turfplaner or an adjacent surface which is to be mimicked such as hardscape. The surface of the uncut turf, 304, has a contour pattern which is not necessarily parallel to the desired cut profile and any soil above the level of the desired cut profile, represented by the height of a wall, 306, at any location is preferably to be removed by the turfplaner. As would be realized, the amount of turf to be removed varies with position. For the purposes of discussion, the turfplaner would be moving in the direction of arrow, 308, and will be discussed at discrete positions represented in FIGS. 28-30 with the understanding that the turfplaner is moving and therefore the control is dynamic. A laser beam or GPS signal is at a fixed position represented by laser line, 310, and is bound between a laser or GPS upper limit, 312, and a laser or GPS lower limit, 314, wherein under laser or GPS control the turf will be cut a laser or GPS height, 316, below the laser line within the tolerances set forth by the upper limit and lower limit. In one embodiment, hierarchical controller communicates the up and down motion of the turfplaner in response to deviations relative to the laser or GPS beam and, when between the lower laser or GPS limit and upper laser or GPS limit this is a preferred mode excepting for deviations defaulting to a control mode of higher hierarchy as discussed herein.

As the turfplaner moves in the direction of arrow 308 a second region is encountered as represented schematically in FIG. 29 wherein the desired cut profile would require the turfplaner to move below the lower limits of the laser or GPS as represented by laser or GPS height, 316', not reaching the lower laser or GPS lower limit, 314. In this embodiment, the hierarchical controller overrides laser or GPS control and switches to autograde control and therefore autograde has a higher hierarchy in controlling the up and down motion of the turfplaner than laser or GPS control. In autograde control the autograde skid, 134 of FIG. 25, follows the contour of the previous cut or adjacent surface, 302, thereby insuring the active pass mimics, on at least one side, the previous contour thereby insuring a smooth transition perpendicular to the direction of travel. It would be apparent that autograde is operative on an adjacent surface and therefore is preferably on the side of the turfplaner which is adjacent the previous cut or adjacent surface to be mimicked. The side away from the adjacent surface can remain under laser or GPS control or autodepth control as will be more fully described.

An additional embodiment will be described with further reference to FIG. 29. In instances where the depth of cut necessary to mimic the adjacent surface is higher than a predefined maximum depth of cut autodepth control may have a higher hierarchy than laser or GPS control or autograde control for the up and down motion of the turfplaner and therefore the hierarchical controller may override autograde control in favor of autodepth control. In this instance a maximum cut depth may be set wherein the maximum cut depth insures that the maximum amount of turf removed does not exceed a preset limit.

As the turfplaner continues to move in the direction of arrow 308 a third region is encountered as represented schematically in FIG. 30. In FIG. 30 the desired cut profile is within the limits of the laser or GPS, represented by laser or GPS height 316", however the amount of turf to be removed exceeds a predetermined limit with the maximum cut depth represented by 318 in this embodiment. Movement of the autodepth shoe, 330, relative to the rear roller, 332, would activate the autodepth adjuster, 136, and laser or GPS control would be relinquished. In this embodiment autodepth control has a higher hierarchy than the laser or GPS control and the hierarchical controller controls the up and down motion of the turfplaner based on autodepth control until the maximum cut depth is no longer exceeded wherein laser or GPS control, or autograde control, is reestablished.

Figure 31:
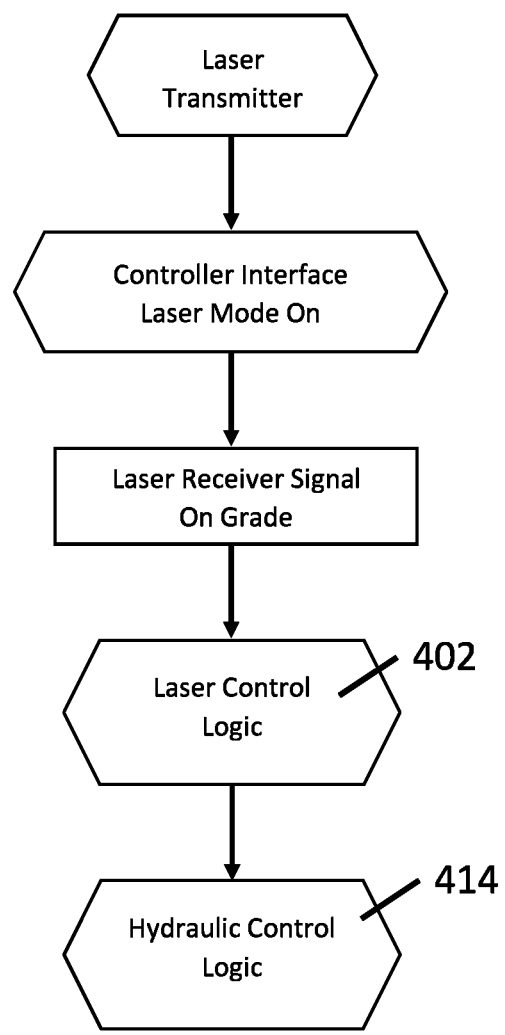
FIG. 31 is a flow chart portion for the hierarchical controller decisions when the laser signal is received as on grade.
Figure 32:
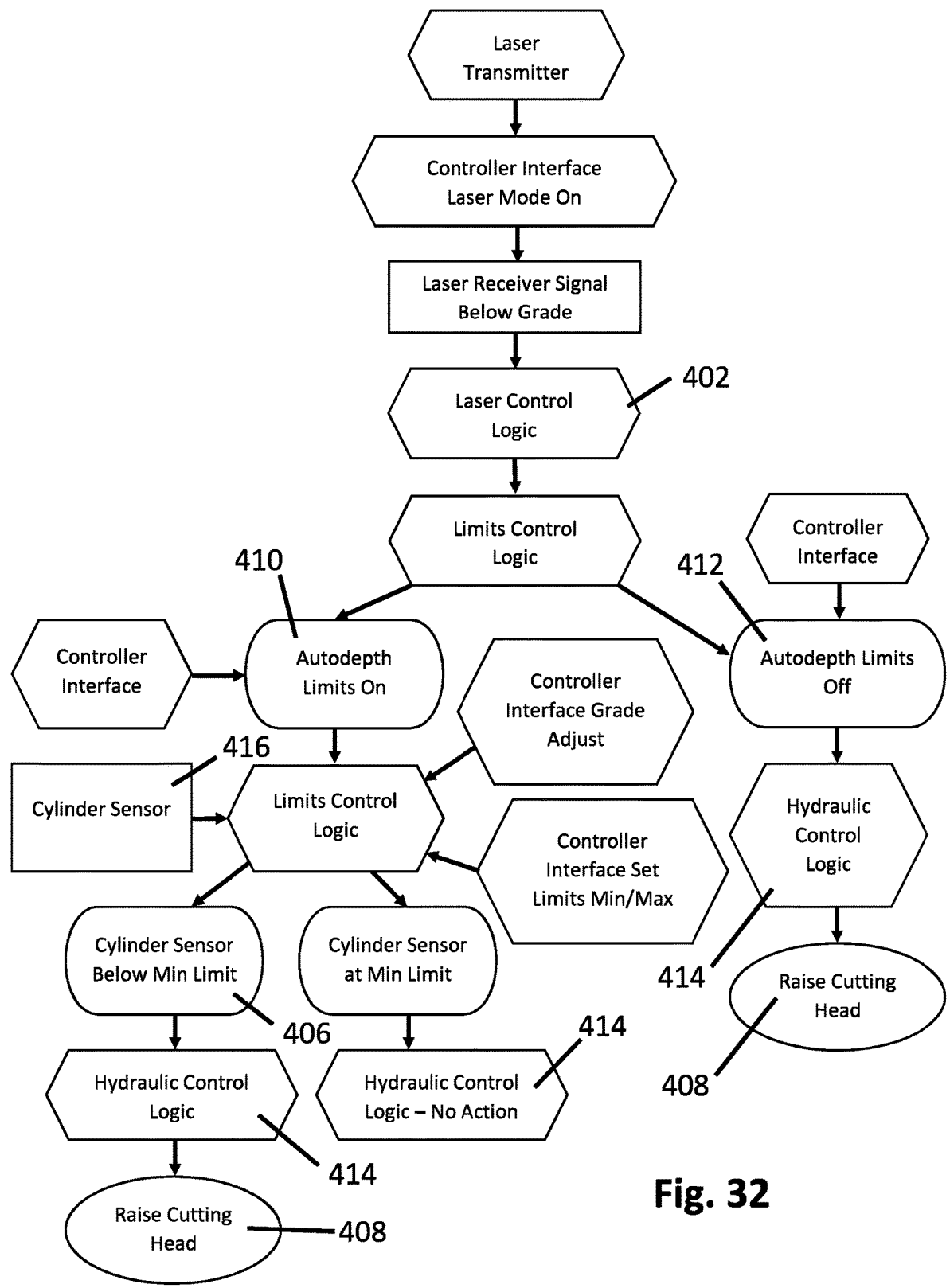
FIG. 32 is a flow chart portion for the hierarchical controller decisions when the laser signal is received as below grade.
Figure 33:
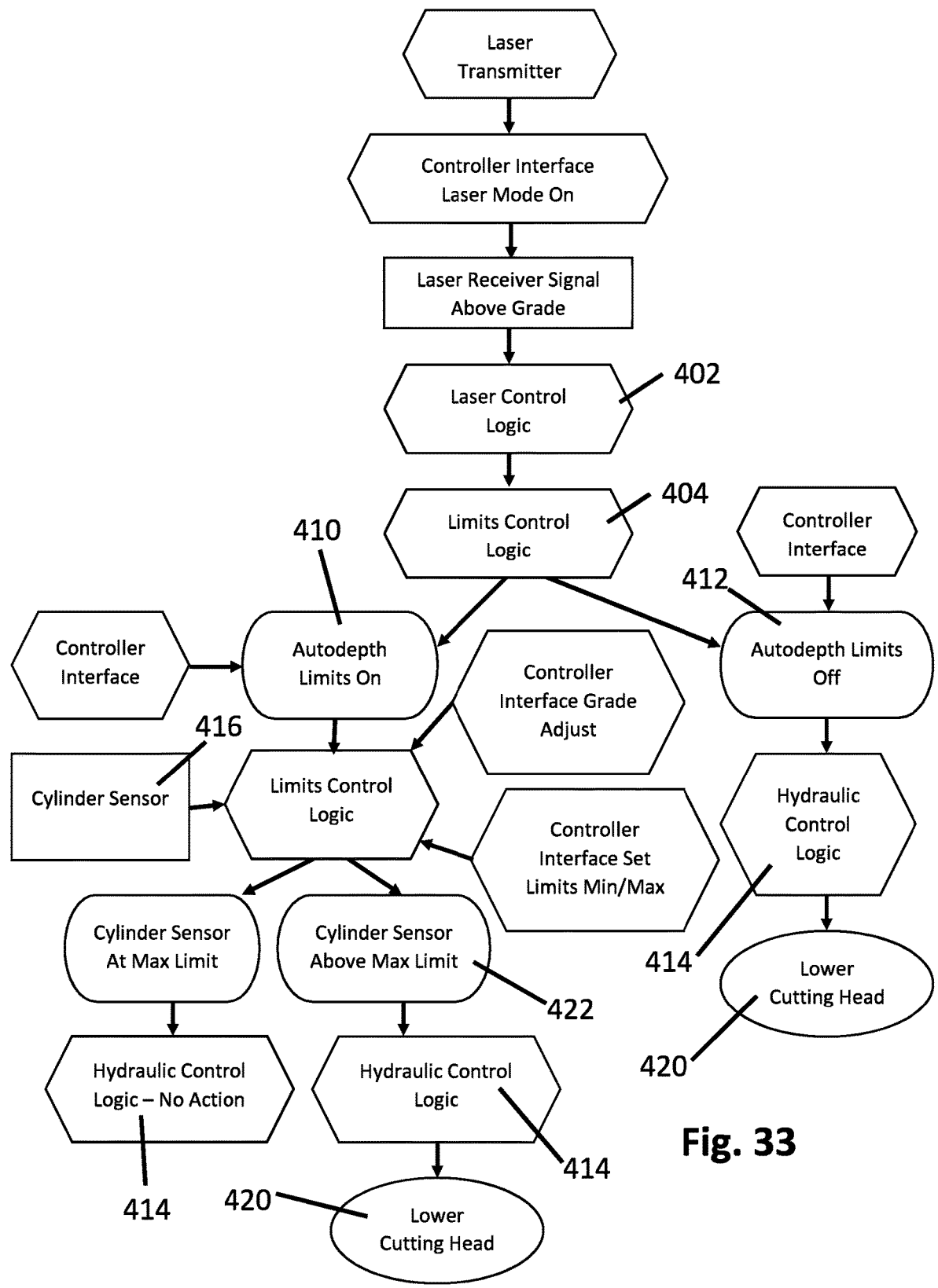
FIG. 33 is a flow chart portion for the hierarchical controller decisions when the laser signal is received as above grade.

FIGS. 31-33 illustrate flow diagrams of the hierarchical controller 119 decision process that enables precise control of the turfplaner cutting head. FIGS. 31-33 depict only one side (left side) of control for the turfplaner, which are duplicated on the other side (right side) of the turfplaner. The hierarchical controller 119 communicates and interfaces with the laser or GPS control 116 to determine which mode of cutting head control is active; either on grade (see FIG. 31), or below grade (see FIG. 32), or above grade (see FIG. 33). When the laser or GPS signal is read by the hierarchical controller 119 to be on grade, i.e. between laser or GPS upper limit 312 and a laser or GPS lower limit 314 (see FIGS. 28-30), the laser or GPS control logic 402 has no limits and conditions a control signal to maintain the turf cut at a setpoint laser or GPS height 316. The hierarchical controller 119 controls the lift mechanism, via the control hydraulic cylinders 87, by one of deviation between the cut height and the desired cut profile using at least one control mode selected from the group consisting of on grade, above grade, and below grade. The hierarchical controller 119 determines which control mode to activate using at least one control hydraulic cylinder 87 position sensor and predetermined control logic limits 404. The hierarchical controller 119 performs the steps of receiving a laser or GPS signal from the at least one laser or GPS receiver 118; determining if the laser or GPS signal is on grade, below grade, or above grade; activating the on grade control mode if the laser or GPS signal is on grade, thereby controlling the cutting head position using only hydraulic control logic; activating the below grade control mode if the laser or GPS signal is below grade, thereby controlling the cutting head position using predetermined control logic limits for autodepth or autograde and at least one control hydraulic cylinder position sensor; or activating the above grade control mode if the laser or GPS signal is above grade, thereby controlling the cutting head position using predetermined control logic limits for autodepth or autograde and at least one control hydraulic cylinder position sensor 416.

The below grade flow diagram seen in FIG. 32 describes the hierarchical controller 119 control logic that instructs the hydraulic control logic 414 to raise the cutting head 408 when the predetermined autodepth limits are on 410 and the control hydraulic cylinder 87 position sensor 416 is below the minimum position limit 406. If the autodepth limits are off 412, lifting mechanism control is returned to the on grade hydraulic control logic 414 to raise the cutting head 408.

The above grade flow diagram seen in FIG. 33 describes the hierarchical controller 119 control logic that instructs the hydraulic control logic 414 to lower the cutting head 420 when the predetermined autodepth limits are on 410 and the control hydraulic cylinder 87 position sensor 416 is above the maximum limit 422. If the autodepth limits are off 412, lifting mechanism control is returned to the on grade hydraulic control logic 414 to lower the cutting head 420.

Figure 34:
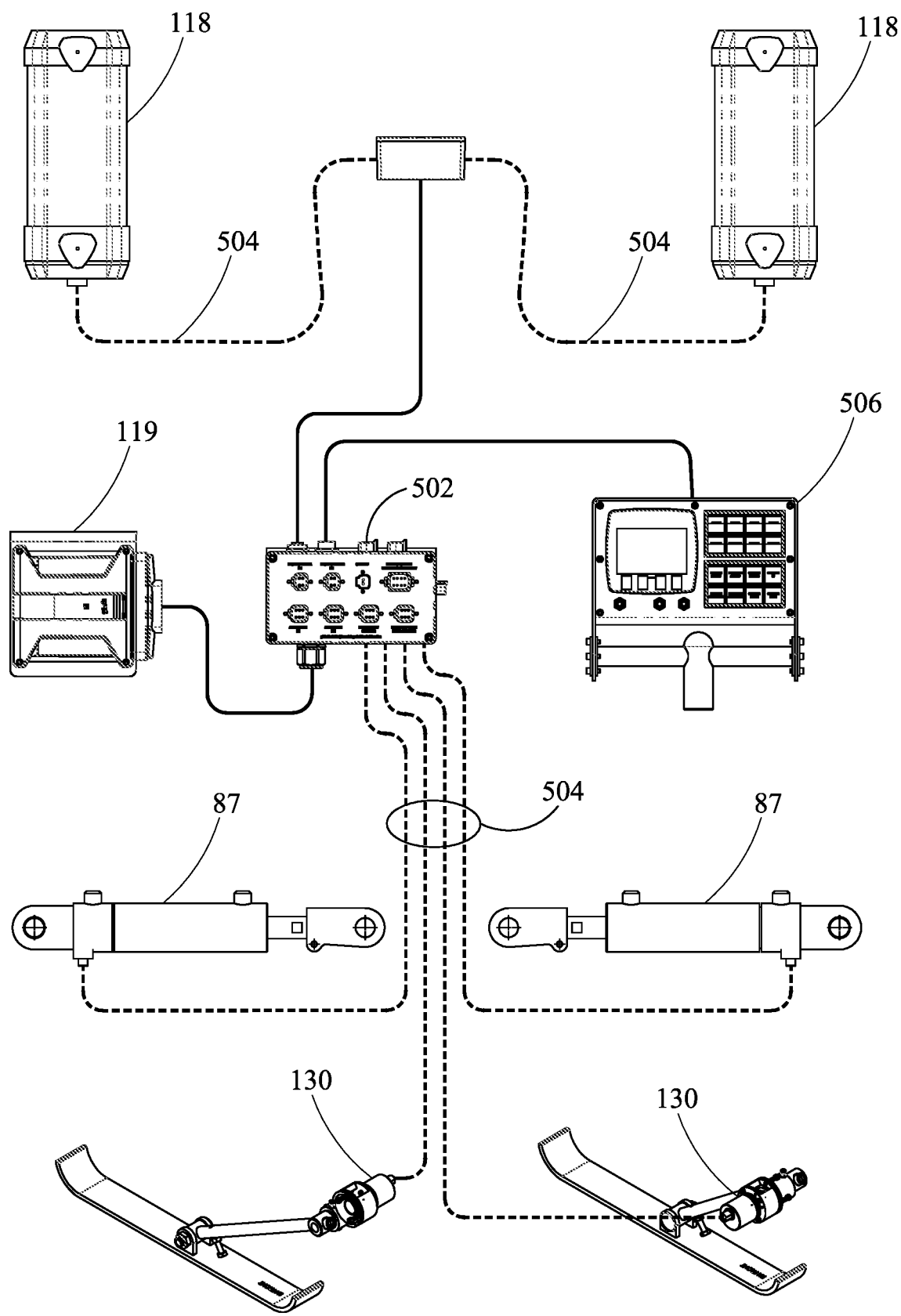
FIG. 34 illustrates typical control components for a hierarchical control system.

FIG. 34 illustrates major control components of an electronic embodiment of the hierarchical controller 119 in communication with a junction box 502 that transmits and receives control signals 504 for positioning the lifting mechanism. Typical components can include at least one laser receiver or GPS receiver 118, a controller console 506, at least one control hydraulic cylinder 87 with integrated electronic sensor, and at least one autograde device 130 with integrated electronic position encoder. Electronic control adds reliability and durability to the entire control system.

The embodiment illustrated has a conveyor which is in a fixed orientation relative to the direction of travel for the turfplaner. Other embodiments are envisioned with the conveyor being capable of discharging from either side, the front or the back. A conveyor which rotates relative to the direction of travel is considered within the scope of the invention yet this is less desirable due to cost considerations. It is most preferable that the direction of travel be such that the conveyor discharges away from previously planed areas. This arrangement is preferable since it is desirable to avoid spillage of discharged material onto previously planed areas and it is desirable to not have transport vehicles on previously planed areas.

The present invention eliminates multiple passes to level an area or to make the area coplanar with an adjacent area. In practice, the invention can provide a surface which is within $1/16$ ($\pm 1/32$) of an inch of the desired pattern. This is previously unobtainable without hierarchical control, especially in a single pass.

Various components of the turfplaner are illustrated which are not specifically recited herein. Specifically, various covers, brackets, bushings, spacers, supports, etc. which would be included for structural strength, aesthetics or to avoid contact between various components are not specifically called out but are set forth in the figures and would be readily understood to be a design choice by one of skill in the art.

The invention has been described with particular reference to the preferred embodiments without limit thereto. One of skill in the art would readily realize additional embodiments, alterations and improvements which are not specifically enumerated herein but which are within the scope of the invention as specifically set forth in the claims appended hereto.

The invention claimed is:

1. A turfplaner capable of being transported over an area wherein said turfplaner comprises:
   a rotational elongated cutter comprising a first side and a second side and a lift mechanism capable of independently altering a cut height of said first side of said rotational cutter and said second side of said rotational cutter based on a deviations between said cut heights and a desired cut profile;

a hierarchical controller in functional communication with said lift mechanism wherein said lift mechanism alters said cut heights based on said deviations of said cut relative to said desired cut profile in response to said functional communication wherein said hierarchical controller comprises:

a guidance system comprising:
at least one of a planer laser beam and a GPS guidance system extending over said area; and
at least one of a laser receiver and a GPS receiver disposed on at least one of said first side or said second side wherein said laser or GPS receiver is positioned to intercept said planer laser beam or GPS signal and define a laser height or GPS height above said first side or said second side cut height, said laser receiver or GPS receiver in functional communication with said hierarchical controller, said hierarchical controller capable of determining and minimizing a first side or second side deviation between said first side or said second side cut height and said desired cut profile based on said defined laser height or GPS height;

at least one autograde device on at least one of said first side or said second side wherein said autograde device is in functional communication with said hierarchical controller, wherein said autograde device measures said first side or said second side cut height relative to a first side or second side adjacent profile and said hierarchical controller is capable of determining and minimizing said first side or second side deviation of said first side or said second side cut height relative to said first side or second side adjacent profile and controlling said lift mechanism to minimize said first side or second side deviation of said first side or said second side cut height relative to said first side or second side adjacent profile; and an autodepth device in functional communication with said hierarchical controller wherein said autodepth device comprises a mechanism for measuring a cut depth in said area;

wherein said hierarchical controller communicates a cutting head height adjustment using at least one control mode selected from the group consisting of on grade, above grade, and below grade.

2. The turfplaner of claim 1 comprising at least one laser receiver or GPS receiver on each of said first side and said second side.

3. The turfplaner of claim 1 comprising at least one of an upper laser limit, an upper GPS limit, a lower laser limit, a lower GPS limit, and wherein said hierarchical controller is capable of determining if said laser or GPS receiver is between said upper laser limit and said lower laser limit or between said upper GPS limit and said lower GPS limit.

4. The turfplaner of claim 3 wherein said hierarchical controller is capable of controlling said lift mechanism by said autograde device or said autodepth device if said laser or GPS receiver is not within said upper laser limit and said lower laser limit or between said upper GPS limit and said lower GPS limit.

5. The turfplaner of claim 1 comprising two autograde devices with one said autograde device on each of said first side and said second side.

6. The turfplaner of claim 1 wherein said autograde device comprises an autograde skid.

7. The turfplaner of claim 6 wherein said autograde skid is at least 15 cm to no more than 61 cm long.

8. The turfplaner of claim 6 wherein said autograde skid has upturned ends.

9. The turfplaner of claim 1 comprising two autodepth devices with one said autodepth device on each of said first side and said second side.

10. A method of contouring an area of turf comprising:
providing at least one planer laser beam or GPS guidance system extending over said area;
providing a desired cut profile to a hierarchical controller;
providing a turfplaner comprising:
a rotational elongated cutter comprising a first side and a second side; and a lift mechanism capable of independently altering a cut height of said first side of said rotational cutter and said second side of said rotational based on deviations between said cut heights and the desired cut profile;
said hierarchical controller in functional communication with said lift mechanism wherein said lift mechanism alters said cut heights based on said deviations of said cut heights relative to said desired cut profile in response to said functional communication wherein said hierarchical controller comprises:
at least one of a laser receiver and a GPS receiver disposed on at least one of said first side or said second side wherein said laser or GPS receiver is positioned to intercept said planer laser beam or GPS signal and define a laser height or GPS height above said first side or said second side cut height, said laser receiver or GPS receiver in functional communication with said hierarchical controller, said hierarchical controller capable of determining and minimizing a first side or second side deviation between said first side or said second side cut height and said desired cut profile based on said defined laser height or GPS height;
at least one autograde device on at least one of said first side or said second side wherein said autograde device is in functional communication with said hierarchical controller, wherein said autograde device measures said first side or said second side cut height relative to a first side or second side adjacent profile and said hierarchical controller is capable of determining and minimizing said first side or second side deviation of said first side or said second side cut height relative to said first side or second side adjacent profile and controlling said lift mechanism to minimize said first side or second side deviation of said first side or said second side cut height relative to said first side or second side adjacent profile; and
an autodepth device in functional communication with said hierarchical controller wherein said autodepth device comprises a mechanism for measuring a cut depth in said area; and
pulling said turfplaner over said area of turf, wherein said hierarchical controller controls said lift mechanism based on said deviations between said cut height and said desired cut profile using at least one control mode selected from the group consisting of on grade, above grade, and below grade.

11. The method of contouring an area of turf of claim 10 wherein said hierarchical controller determines which control mode to activate using at least one control hydraulic cylinder position sensor and predetermined control logic limits.

12. The method of contouring an area of turf of claim 11 wherein said hierarchical controller performs the steps of:
- receiving a laser signal or GPS signal from the at least one laser receiver or GPS receiver;
- determining if the laser signal or GPS signal is on grade, below grade, or above grade;
- activating said on grade control mode if the laser signal or GPS signal is on grade, thereby controlling the cutting head position using only hydraulic control logic;
- activating said below grade control mode if the laser signal of GPS signal is below grade, thereby controlling the cutting head position using said predetermined control logic limits for autodepth or autograde said and at least one control hydraulic cylinder position sensor;
- activating said above grade control mode if the laser signal or GPS signal is above grade, thereby controlling the cutting head position using said predetermined control logic limits for autodepth or autograde said and at least one control hydraulic cylinder position sensor.

13. The method of contouring an area of turf of claim 10 wherein said turfplaner comprises a laser receiver or GPS receiver on each of said first side and said second side.

14. The method of contouring an area of turf of claim 11 wherein said predetermined control logic limits comprise at least one of an upper laser limit, an upper GPS limit, a lower laser limit, a lower GPS limit, and wherein said hierarchical controller is capable of determining if said laser or GPS receiver is between said upper laser limit and said lower laser limit or between said upper GPS limit and said lower GPS limit.

15. The method of contouring an area of turf of claim 12 wherein said hierarchical controller is capable of controlling said lift mechanism by said autograde device or said autodepth device if said laser receiver or GPS receiver is not between said upper laser limit and said lower laser limit or between said upper GPS limit and said lower GPS limit.

16. The method of contouring an area of turf of claim 10 wherein said turfplaner comprises two autograde devices with one said autograde device on each of said first side and said second side.

17. The method of contouring an area of turf of claim 10 wherein said autograde device comprises an autograde skid.

18. The method of contouring an area of turf of claim 17 wherein said autograde skid is at least 15 cm to no more than 61 cm long.

19. The method of contouring an area of turf of claim 17 wherein said autograde skid has upturned ends.

20. The method of contouring an area of turf of claim 10 wherein said turfplaner comprises two autodepth devices with one said autodepth device on each of said first side and said second side.

* * * * *